United States Patent [19]
Moseley et al.

[11] Patent Number: 5,953,148
[45] Date of Patent: Sep. 14, 1999

[54] SPATIAL LIGHT MODULATOR AND DIRECTIONAL DISPLAY

[75] Inventors: Richard Robert Moseley, Bourton-on-the-water; Graham John Woodgate, Henley-on-Thames; David Ezra, Wallingford; Jonathan Harrold, Sandford-on-Thames, all of United Kingdom

[73] Assignee: Sharp Kabushiki Kaisha, Osaka, Japan

[21] Appl. No.: 08/937,857

[22] Filed: Sep. 25, 1997

[30] Foreign Application Priority Data

Sep. 30, 1996 [GB] United Kingdom .................. 9620392

[51] Int. Cl.$^6$ ...................... G02F 1/1345; G02F 1/1347; G02F 1/1343
[52] U.S. Cl. .......................... 359/237; 359/253; 359/254; 349/143; 349/144; 349/145; 349/146; 349/110
[58] Field of Search ..................................... 349/143–146, 349/110; 348/59, 60; 359/237, 253, 254

[56] References Cited

U.S. PATENT DOCUMENTS

| 5,146,356 | 9/1992 | Carlson | 349/143 |
|---|---|---|---|
| 5,576,862 | 11/1996 | Sugiyama et al. | 349/143 |

FOREIGN PATENT DOCUMENTS

| 0354851 | 2/1990 | European Pat. Off. . |
|---|---|---|
| 0404289 | 12/1990 | European Pat. Off. . |
| 0498498 | 8/1992 | European Pat. Off. . |
| 0545492 | 6/1993 | European Pat. Off. . |
| 0625861 | 11/1994 | European Pat. Off. . |
| 0707232 | 4/1996 | European Pat. Off. . |
| 0721131 | 7/1996 | European Pat. Off. . |
| 0726482 | 8/1996 | European Pat. Off. . |
| 0752609 | 1/1997 | European Pat. Off. . |
| 0786912 | 7/1997 | European Pat. Off. . |
| 2278223 | 11/1994 | United Kingdom . |
| 2302978 | 2/1997 | United Kingdom . |
| 2309609 | 7/1997 | United Kingdom . |
| 9702709 | 1/1997 | WIPO . |

OTHER PUBLICATIONS

J. B. Eichenlaub, SPIE, vol. 2177, pp. 4–15, 1994, "An Autostereoscopic Display With High Brightness and Power Efficiency".
C. van Berkel et al., IS&T/SPIE Symposium on Electronic Imaging, 1996, "Multiview 3D–LCD".
C. van Berkel et al., Euro Display '96, pp. 109–112, 1996, "Design and Applications of Multiview 3D–LCD".
Search Report for Application No. GB9620392.2; Dated Dec. 5, 1996.

*Primary Examiner*—Georgia Epps
*Assistant Examiner*—Margaret Burke

[57] ABSTRACT

A spatial light modulator comprises a plurality of picture elements arranged as rows and columns. The columns are arranged as adjacent groups, for instance for association with an element of a parallax device to provide an autostereoscopic 3D display. Adjacent picture elements disclosed in each row and in adjacent columns of each group overlap horizontally so that there are overlapping regions and non-overlapping regions. The vertical extent of each picture element is substantially constant throughout the non-overlapping region and is substantially equal to the sum of the heights of the adjacent picture elements throughout the overlapping regions.

44 Claims, 16 Drawing Sheets

FIG 8a
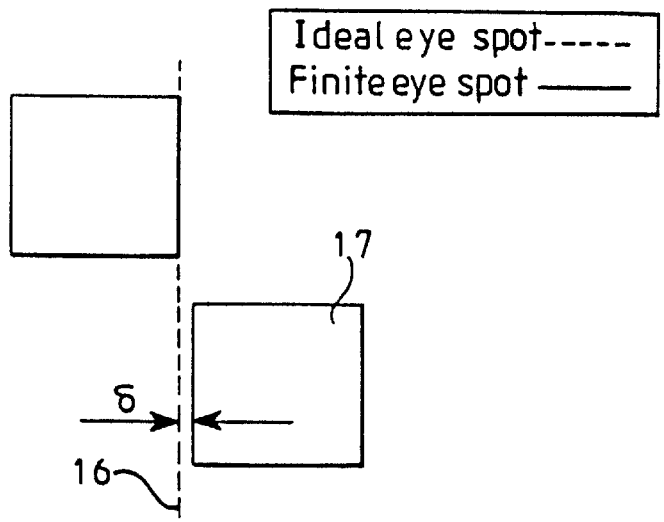
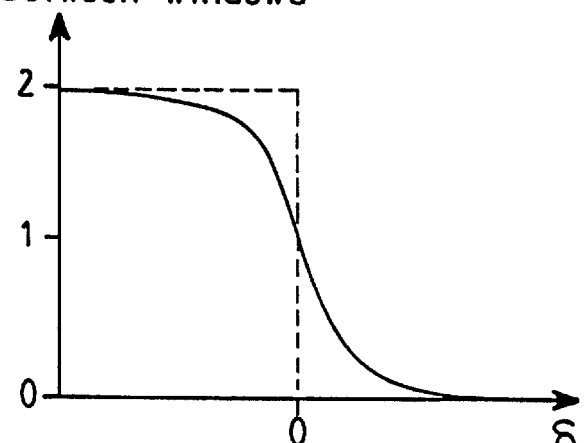
Intensity across window boundary (for δ as show above)
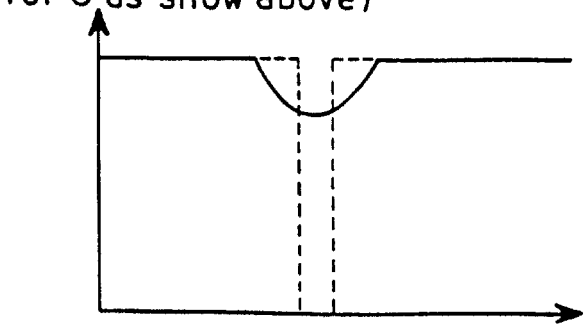

FIG 8b
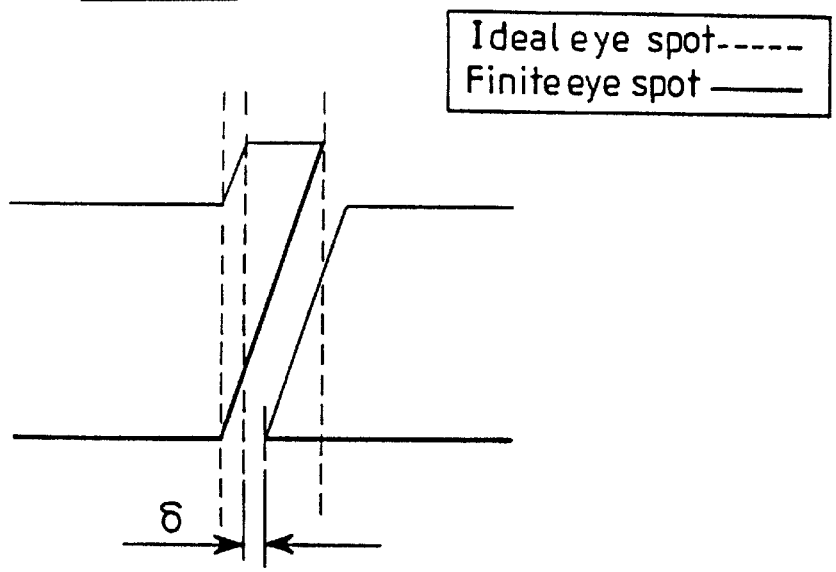
Ideal eye spot -----
Finite eye spot ———
Intensity at boundary between windows
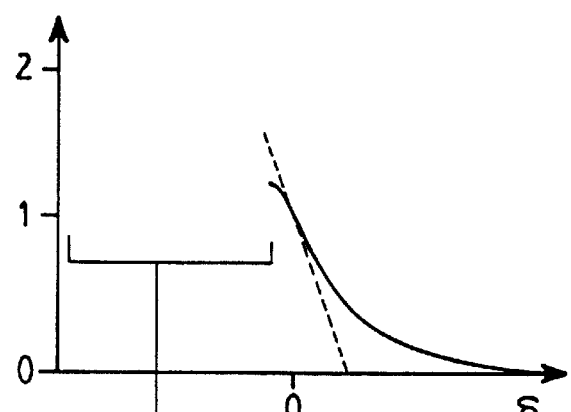
Unattainable region due to pixel conflict
Intensity across window boundary (for δ as shown above)
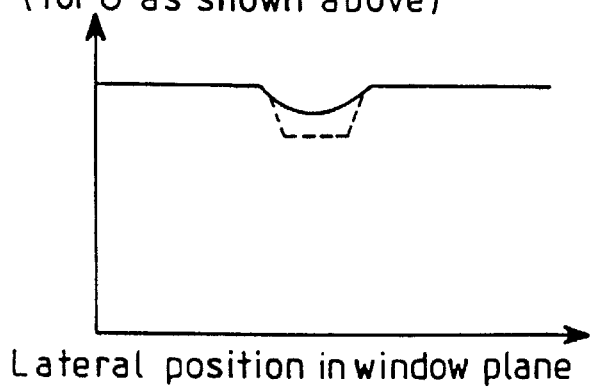
Lateral position in window plane

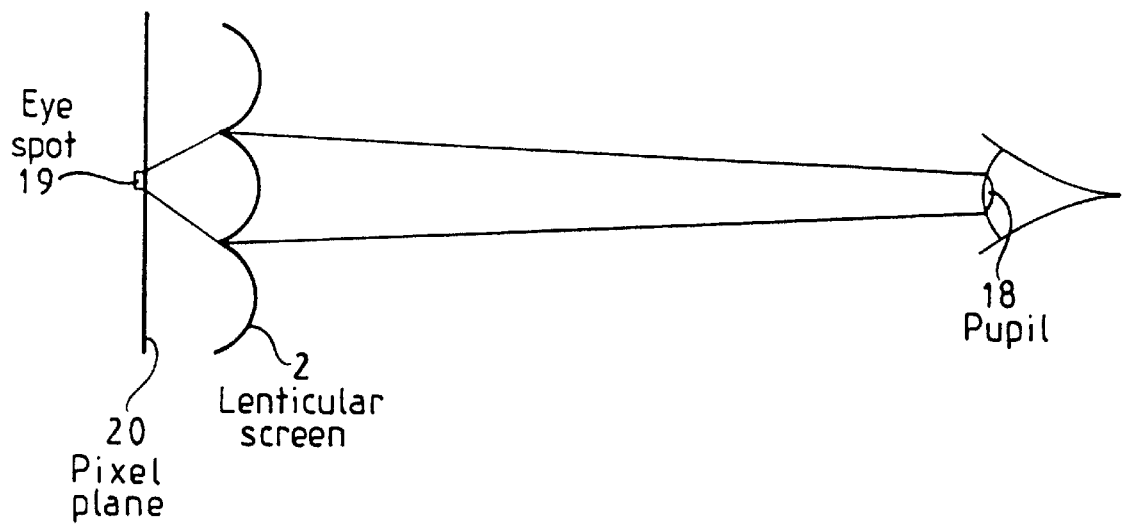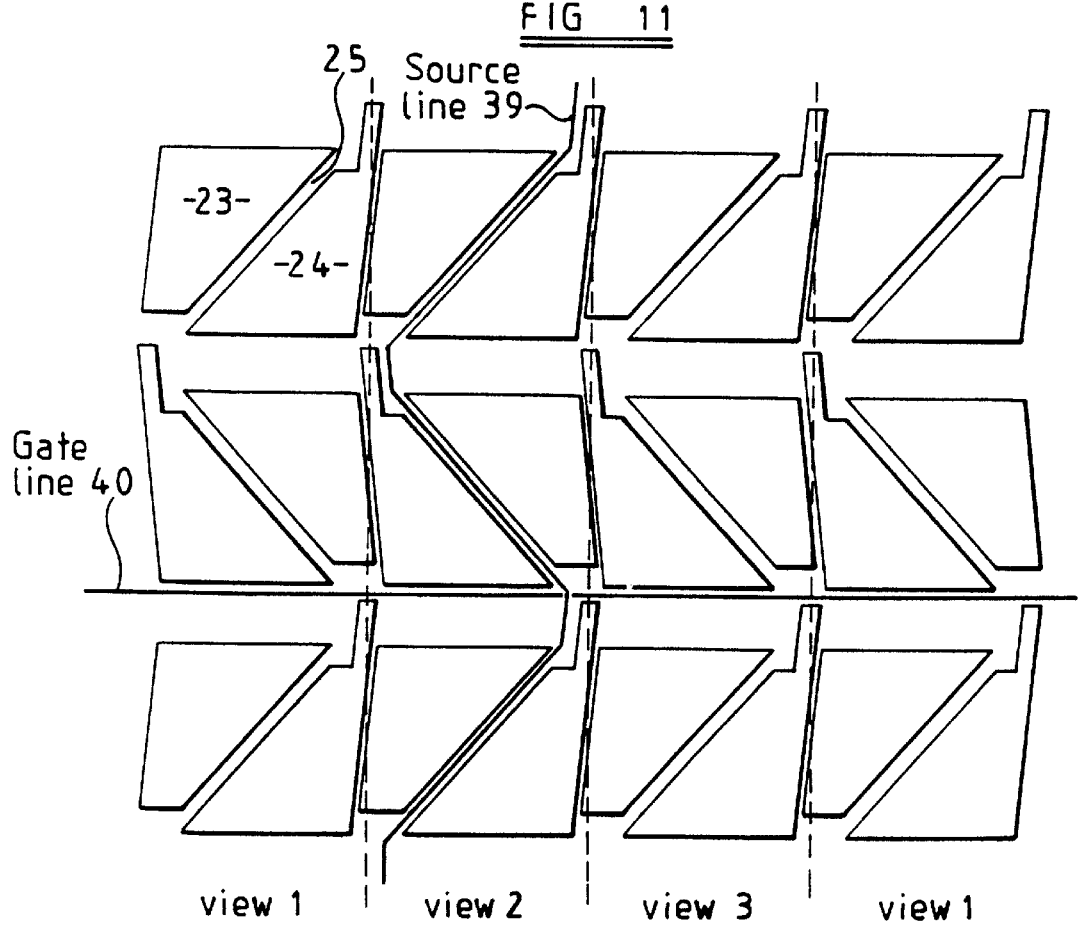

FIG 10
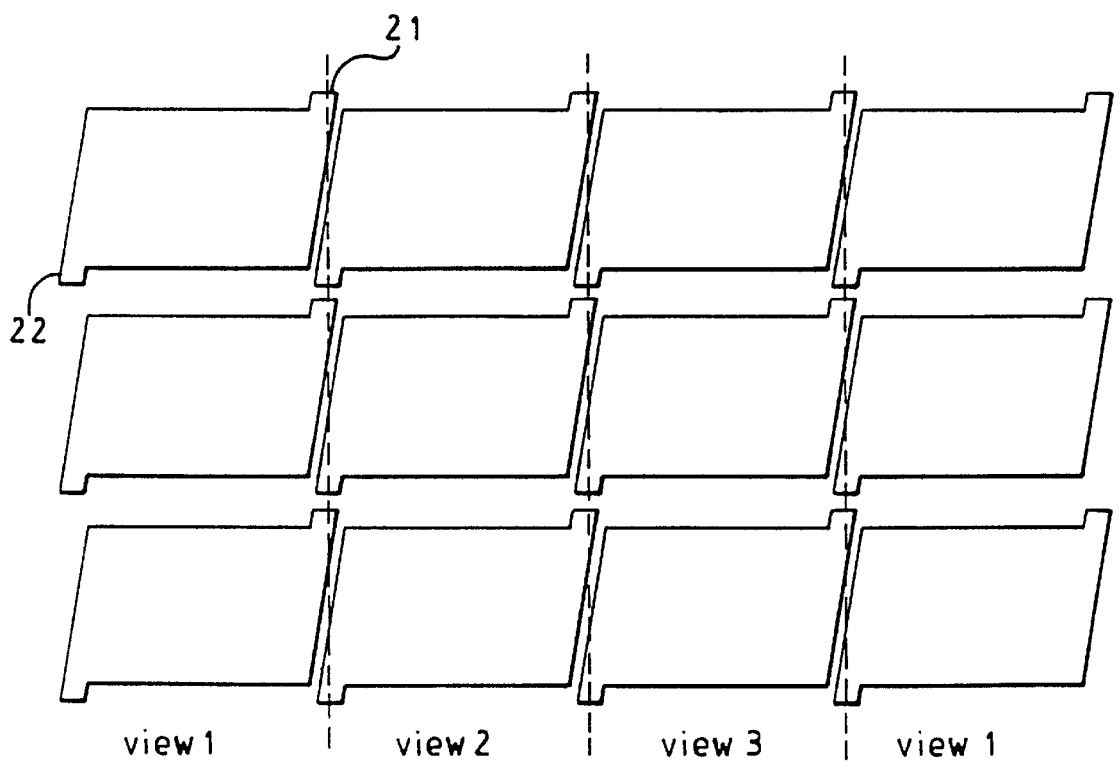
view 1   view 2   view 3   view 1
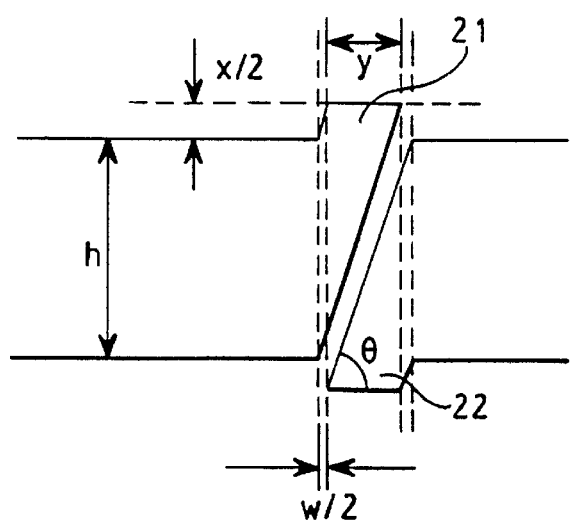

26 — Small gap between pixels
27 — Cut away corner to maintain vertical extent
25 — Wider gap for vertical conductor line through pixel

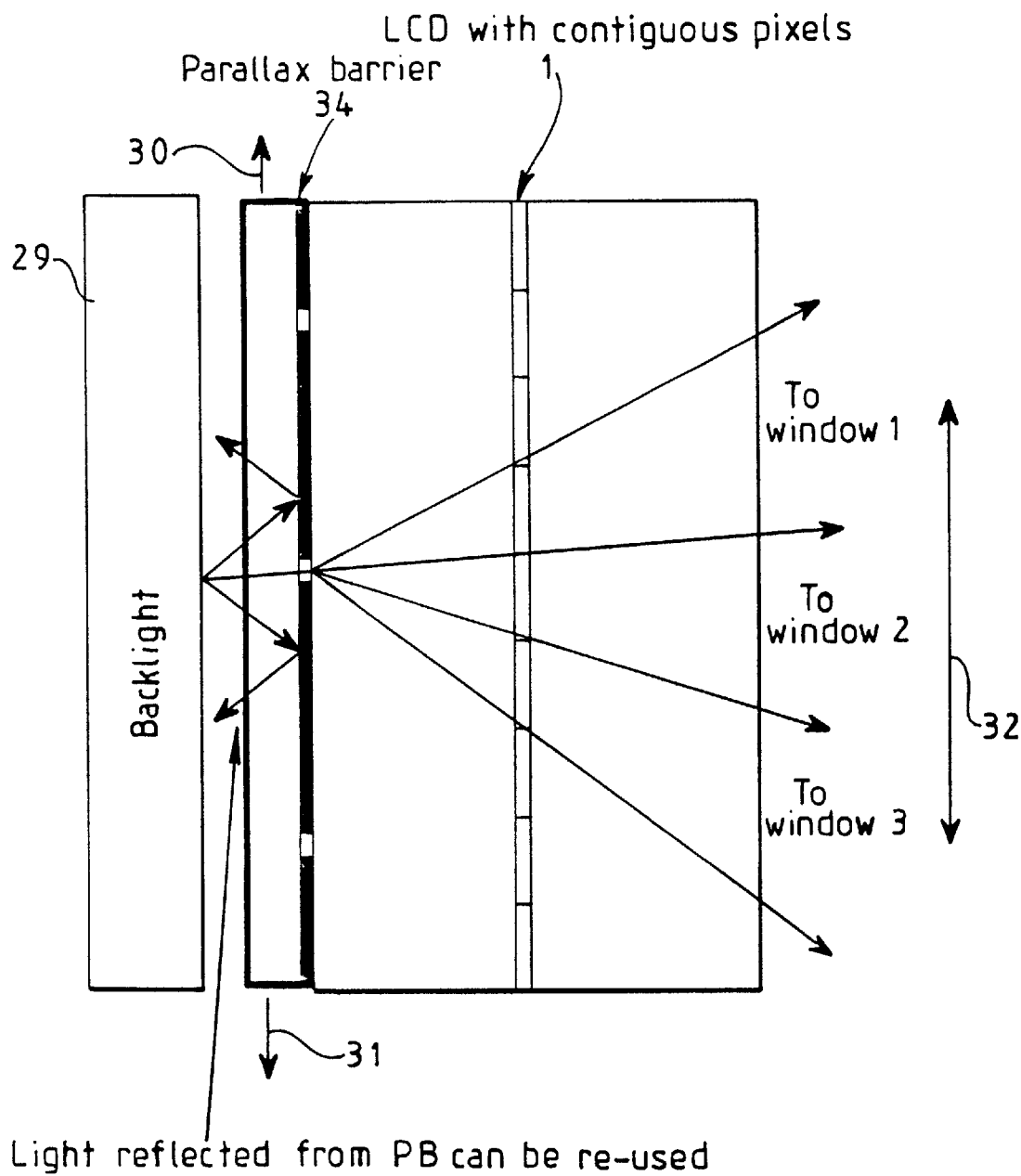

SPATIAL LIGHT MODULATOR AND DIRECTIONAL DISPLAY

FIELD OF THE INVENTION

The present invention relates to a spatial light modulator (SLM) and to a directional display. The directional display may, for instance, be a three dimensional (3D) autostereoscopic display.

BACKGROUND OF THE INVENTION

The term "spatial light modulator" as used herein is defined to include not only devices which modulate light from an external light source but also devices which emit light of a modulatable intensity.

EP 0 625 861 discloses an SLM having a picture element (pixel) pattern which is suitable for generating contiguous viewing windows when used in an autostereoscopic display. For instance, when used with a parallax device such as a parallax barrier or lenticular screen, there is a smooth transition from one view to another when an observer moves laterally with respect to the display. In particular, undesirable black band features and image intensity modulation are reduced or eliminated. Such a display is suitable for tracking the movement of an observer electronically so as to increase the observer viewing freedom while perceiving the 3D effect. Suitable lateral and longitudinal tracking techniques are disclosed in EP 0 726 482 and EP 0 721 131. Further, a technique for manufacturing an SLM of this type is disclosed in GB 2 302 978 and EP 0 752 609. GB 2 309 609 and EP 0 786 912 discloses an SLM having a different pixel pattern. In this case, adjacent pixels overlap horizontally so that, when used in an autostereoscopic 3D display, the viewing windows overlap laterally. This type of display is also suitable for providing electronic tracking of an observer.

EP 0 404 289 discloses an autostereoscopic 3D display comprising a flat display panel associated with a lenticular screen employing pitch changes and thickness changes. Tracking of the position of an observer so that viewing windows follow the observer is achieved by moving the lenticular screen laterally and longitudinally with respect to the display panel.

EP 0 354 851 discloses an autostereoscopic 3D display in which an image source is located behind a lenticular screen. In order to provide observer tracking, the image information supplied to the image source pixels is changed in accordance with the observer position so as to keep the observer in the correct stereoscopic zone while permitting movement.

J. B. Eichenlaub, "An autostereoscopic Display with High Brightness and Power Efficiency", SPIE Vol. 2177, 4–15 (1994) discloses a rear illumination of the autostereoscopic display in which a set of optics produces a set of thin vertical light lines behind an SLM. These light lines co-operate with the pixel apertures of the SLM to provide directional illumination. Observer tracking is achieved by moving the positions of the light lines relative to the SLM. The light lines are produced by imaging a light source through a lenticular screen to provide vertical thin bright images on a diffuser, which images act as thin strip sources of non-directional light. Several light sources are provided and, by switching between the different light sources, the images on the diffuser change position so as to simulate a moving light source.

C. Van Berkel, D. W. Parker, A. R. Franklin, "Multi-View 3D-LCD", IS&T/SPIE Symposium on Electronic Imaging: Stereoscopic Displays and Applications VIII, (San Jose, USA, 1996) disclose an autostereoscopic display comprising a liquid crystal device (LCD) disposed behind a lenticular screen. The LCD is of a standard type but has a relatively high aperture ratio (ratio of total pixel area to panel area).

The autostereoscopic 3D display illustrated diagrammatically in FIG. 1 of the accompanying drawings comprises a known type of SLM 1 associated with a parallax device in the form of a lenticular screen 2. The SLM 1 has pixels arranged as horizontal rows and vertical columns. The display is of the type which provides three views in three adjacent viewing regions or windows for an observer. Thus, three columns of pixels are disposed behind each lenticule, such as 3, of the screen 2. The columns behind the lenticule 3 are indicated in FIG. 1 as providing views 1, 2 and 3. The lenticule images the pixel columns into the three adjacent viewing windows.

The pixel columns display vertical slices of three two dimensional (2D) views taken in directions corresponding to the directions in which the three views are visible to an observer observing the 3D display. Thus, when the eyes of an observer are located in adjacent viewing windows, the observer sees a 3D image autostereoscopically i.e. without requiring any viewing aids.

The pixels such as 4 have the shape of two adjacent rectangles as defined by a black mask 5 of the SLM 1. Further, the pixel columns are separated from each other by vertical black mask strips. This gives rise to variations in illumination intensity illustrated in FIG. 2 of the accompanying drawings which is a diagrammatic plan view showing the SLM 1 and the lenticular screen 2. Each lenticule images the three associated columns of pixels 4 into viewing directions of varying illumination. For instance, the column containing the pixel 4 shown in FIG. 1 gives rise to a region 6 of maximum illumination corresponding to the portion of the pixel of greatest height, a region 7 of reduced illumination corresponding to the portion of the pixel of reduced vertical height, and a dark region 8 in which the vertical black mask strip between adjacent columns of pixels is imaged by the lenticule 3. Thus, as an observer moves with respect to the display, the image intensity varies substantially and gives rise to undesirable visual artefacts. Longitudinal and lateral viewing freedom is thus adversely Affected.

Irregular illumination as illustrated in FIG. 2 is caused by differing vertical extents within the pixel shape. When light transmitted through the pixels is imaged through the cylindrical lenses formed by the lenticules of the lenticular screen, there is no restriction on the vertical spreading of light. Thus, at a viewing window plane, a vertical strip of illumination is produced by each part of the pixel. The intensity of the illumination is directly proportional to the vertical extent of the pixel. Thus, for constant illumination, a rectangular pixel shape is desirable. Also, in order to avoid dark regions between illuminated regions, the columns of pixels should be horizontally contiguous, at least below each lenticule.

FIG. 3 of the accompanying drawings illustrates an SLM of the type disclosed in EP 0 625 861. The pixels are arranged as rows and columns such that the pixels in each column are horizontally contiguous with the pixels of the or each adjacent column. Further, the pixels are of rectangular shape so as to have constant vertical extent across the width of the pixel. As shown in FIG. 4 of the accompanying drawings, a display using this pixel arrangement provides contiguous viewing regions 9, 10 and 11 whose illumination intensity is substantially constant and unaffected by lateral movement of an observer.

In order to interleave the pixels of adjacent rows of the layout shown in FIG. 3, the gaps between pixels must be at least as large as the pixels themselves. Thus, the maximum theoretical aperture ratio of an SLM 1 of the type shown in FIG. 3 is 50%. However, in practice, space must be left between the pixels for the routing of electrical connections so that the maximum aperture ratio in practice is less than 50%.

Space must be allowed between the pixel apertures for the routing of conductors controlling the pixels. Such conductors generally comprise row conductors (normally referred to as "gate lines" in standard thin film transistor LCDs), which extend essentially horizontally and connect all the pixels in each row, and column conductors (referred to as "source lines") which extend essentially vertically and interconnect the pixels in each column. In matrix addressed devices, the gate and source lines are addressed in sequence to control the pixels so as to avoid having an individual electrode connection for each pixel.

SUMMARY OF THE INVENTION

According to a first aspect of the invention, there is provided a spatial light modulator comprising a plurality of light output apertures arranged as rows extending in a first direction and columns extending in a second direction substantially perpendicular to the first direction, characterised in that at least one first one and at least one second one of the apertures overlap in the first direction so as to have first and second overlapping regions, respectively, such that the height in the second direction of each of the first and second overlapping regions varies and the sum of the heights of the first and second overlapping regions is substantially constant.

At least one of the first and second apertures may have a first non-overlapping portion whose height is substantially constant and is substantially equal to the sum of the heights of the first and second overlapping regions.

Each of the first and second overlapping regions may be of right-angled triangular shape.

The or each first and second apertures may be offset with respect to each other in the second direction.

The or each first and second apertures may be separated by a gap containing an addressing electrode.

The modulator may comprise a plurality of picture elements, each of which comprises a first sub-picture element defined by one of the first apertures and a second sub-picture element defined by one of the second apertures. The gaps may be inclined with respect to the second direction in opposite directions in adjacent rows of the picture elements.

The modulator may comprise an addressing transistor for addressing the first and second sub-elements of each picture element.

The modulator may comprise first and second addressing transistors for addressing the first and second sub-elements, respectively, of each picture element.

The picture elements may be arranged as groups of N adjacent columns, where N is integer greater than 1, and adjacent picture elements disposed in each row and in adjacent columns of each group may overlap in the first direction so as to have third overlapping regions and second non-overlapping regions, the height of each picture element being substantially constant throughout the second non-overlapping region and being substantially equal to the sum of the heights of the adjacent picture elements throughout the third overlapping regions.

Adjacent picture elements disposed in each row and in adjacent columns of adjacent groups may overlap in the first direction so as have fourth overlapping regions and the sum of the heights of the adjacent picture elements of the adjacent groups throughout the fourth overlapping regions may be substantially equal to the height of the picture elements in the second non-overlapping regions.

Each picture element may have a shape derived from a composite shape comprising: a rectangular portion have first and second sides aligned in the first direction and third and fourth sides aligned in the second direction; a first right-angled triangular portion having a first side coincident with the third side of the rectangular portion, a second side extending co-linearly from the first side of the rectangular portion, and a hypotenuse inclined at a first pre-determined angle to the second direction; a parallelogram portion having a first side coincident with the fourth side of the rectangular portion, a second side opposite the first side, and third and fourth sides parallel to the hypotenuse of the first triangular portion; and a second right-angled triangular portion having a first side coincident with the second side of the parallelogram portion and a hypotenuse parallel to the hypotenuse of the first triangular portion. The width of the parallelogram portion in the first direction may be substantially equal to the width of the gap in the first direction between each picture element and a picture element adjacent the second triangular portion.

Each picture element may have a shape derived from a composite shape comprising: a rectangular portion having first and second sides aligned in the first direction and third and fourth sides aligned in the second direction; a first parallelogram portion having a first side coincident with the fourth side of the rectangular portion, a second side opposite the first side, and third and fourth sides inclined at a second pre-determined angle to the second direction; a first right-angled triangular portion having a first side coincident with the second side of the first parallelogram portion and a hypotenuse parallel to the third and fourth sides of the first parallelogram portion; a second parallelogram portion having a first side coincident with the third side of the rectangular portion, a second side opposite the first side, and third and fourth sides parallel to the third and fourth sides of the first parallelogram portion; and a second right-angled triangular portion having a first side coincident with the second side of the second parallelogram and a hypotenuse parallel to the third and fourth sides of the first parallelogram portion. The width of each of the first and second parallelogram portions in the first direction may be substantially equal to half the width of the gap in the first direction between each adjacent pair of picture elements.

The shape may be derived by dividing the composite shape obliquely with respect to the second direction so as to define the first and second apertures.

Each of the third overlapping regions may be of triangular shape. The adjacent picture elements may be offset with respect to each other in the second direction.

The apertures may define respective picture elements. The picture elements may be arranged as groups of N adjacent columns, where N is an integer greater than 1, and adjacent picture elements disposed in each row and in adjacent columns of each group may be defined by the first and second apertures. Adjacent picture elements disposed in each row and in adjacent columns of adjacent groups may overlap in the first direction so as to have fourth overlapping regions and the sum of the heights of the adjacent picture elements of the adjacent groups throughout the fourth overlapping regions may be substantially equal to the height of the picture elements in the first non-overlapping regions.

Each picture element may have a shape derived from a composite shape comprising: a rectangular portion having first and second sides aligned in the first direction and third and fourth sides aligned in the second direction; a first right-angled triangular portion having a first side coincident with the third side of the rectangular portion, a second side extending co-linearly from the first side of the rectangular portion and a hypotenuse inclined at a first pre-determined angle to the second direction; a parallelogram portion having a first side coincident with the fourth side of the rectangular portion, a second side opposite the first side, and third and fourth sides parallel to the hypotenuse of the first triangular portion; and second right-angled triangular portion having a first side coincident with the second side of the parallelogram portion and a hypotenuse parallel to the hypotenuse of the first triangular portion. The width of the parallelogram portion in the first direction may be substantially equal to the width of the gap in the first direction between each picture element and a picture element adjacent the second triangular portion.

Each picture element may have a shape derived from a composite shape comprising: a rectangular portion having first and second sides aligned in the first direction and third and fourth sides aligned in the second direction; a first parallelogram portion having a first side coincident with the fourth side of the rectangular portion, a second side opposite the first side, and third and fourth sides inclined at a second pre-determined angle to the second direction; a first right-angled triangular portion having a first side coincident with the second side of the first parallelogram portion and a hypotenuse parallel to the third and fourth sides of the first parallelogram portion; a second parallelogram portion having a first side coincident with the third side of the rectangular portion, a second side opposite the first side, and third and fourth sides parallel to the third and fourth sides of the first parallelogram portion; and a second right-angled triangular portion having a first side coincident with the second side of the second parallelogram portion and a hypotenuse parallel to the third and fourth sides of the first parallelogram portion. The width of each of the first and second parallelogram portions in the first direction may be substantially equal to half the width of the gap in the first direction between each adjacent pair of pixels.

Each of the first and second overlapping regions may be of triangular shape. The adjacent picture elements may be offset with respect to each other in the second direction.

The modulator may comprise a liquid crystal device.

The modulator may comprise a light emitting device.

According to a second aspect of the invention, there is provided a directional display characterised by a modulator in accordance with the first aspect of the invention associated with a parallax device having a plurality of parallax elements.

Each of the parallax elements may be associated with a respective one of the groups of columns.

The parallax device may comprise a lenticular screen.

The parallax device may comprise a parallax barrier.

It is thus possible to provide an SLM which is suitable for use in directional displays and which has a relatively high aperture ratio. For instance, where a display is provided by such an SLM and a backlight for illuminating the SLM, a backlight with lower power consumption may be used or a brighter display may be achieved. This is particularly advantageous where the SLM is used in conjunction with a parallax barrier because the parallax barrier operates by restricting the light throughput so that an SLM of higher aperture ratio allows higher brightness to be achieved.

Another advantage is that manufacturing tolerances of such an SLM may be relaxed. During manufacture of a typical SLM, a black mask is formed to define the pixel apertures. In the case of an SLM of the type disclosed in EP 0 625 861, manufacturing tolerances leading to horizontal deviations of the pixel apertures can result in a double brightness viewing region where the pixels overlap or a black viewing region where the pixels underlap. With the pixel arrangement disclosed herein, such manufacturing tolerances lead to an area of increased or decreased intensity so that undesirable visual artefacts are substantially reduced or eliminated.

It is further possible to allow opaque conductors to pass through the pixel apertures without visual artefacts. This in turn allows high aperture ratios to be achieved.

The present arrangement is advantageous for untracked autostereoscopic 3D displays which generate a large number of views but which do not provide observer tracking. In such displays, the SLM resolution is of great importance because the SLM must have N times the required resolution per view, where N is the number of displayed views. The relatively close packing of pixels is advantageous for high resolution, for improving the number of displayed views which is possible, and for improving brightness. In such multiple view displays, substantially contiguous viewing windows are important so as to maintain the transition between views as artefact-free as possible. If the viewing windows are not substantially contiguous, then black bars may be seen moving across the display as the view changes.

The pixel arrangement disclosed herein is also advantageous for observer tracking autostereoscopic 3D displays. Increased brightness may be provided together with electronic lateral and longitudinal tracking without moving parts, for instance as disclosed in FP 0 726 482 and EP 0 721 131. However, mechanical observer tracking may also be used and benefits from the relatively wide uniform intensity windows which can be produced.

Displays of the type disclosed herein may be used, for example, in office environment displays, 3D displays for lap top and personal computers, personal entertainment systems including computer games, 3D television, medical imaging, virtual reality, video phones and arcade video games.

BRIEF DESCRIPTION OF THE DRAWINGS

The invention will be further described, by way of example, with reference to the accompanying drawings, in which:

FIGS. 8a and 8b illustrate the effects of positional errors for a known type of pixel arrangement and for the arrangement illustrated in FIG. 5, respectively;

FIG. 9 illustrates the origin of an "eye spot" in an autostereoscopic 3D display;

FIG. 10 illustrates another pixel arrangement of an SLM constituting an embodiment of the invention;

FIG. 11 illustrates another pixel arrangement of an SLM constituting an embodiment of the invention;

FIGS. 15a, 15b and 15c show 3D autostereoscopic displays constituting embodiments of the invention for providing mechanical observer tracking;

DETAILED DESCRIPTION OF THE INVENTION

Figure 1:
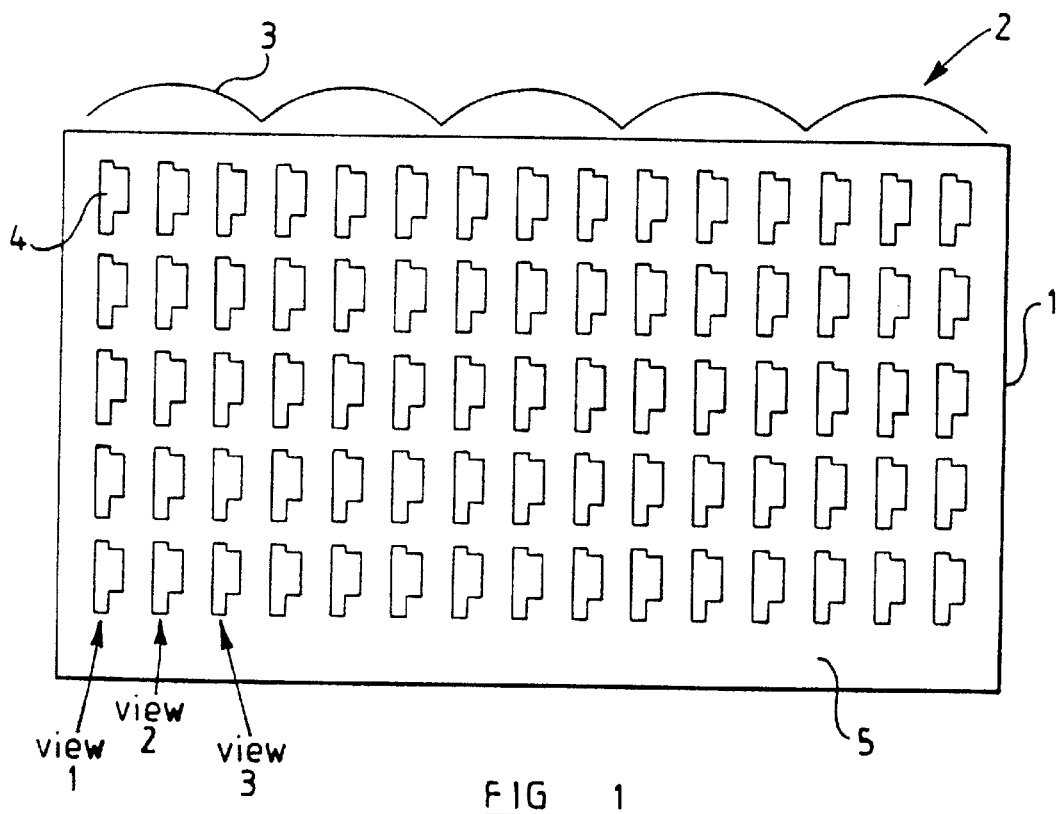
FIG. 1 illustrates diagrammatically the pixel layout of a known type of LCD disposed behind a lenticular screen to form an autostereoscopic 3D display.
Figure 2:
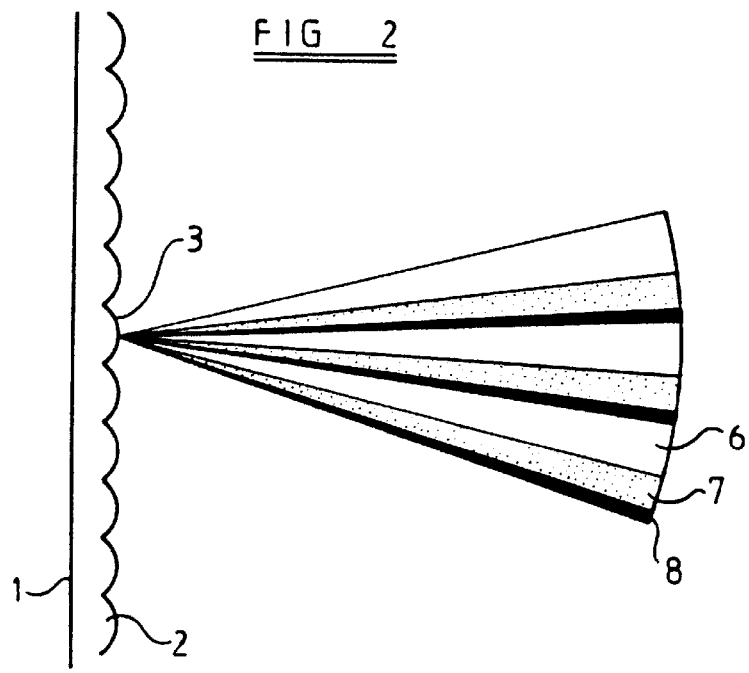
FIG. 2 illustrates illumination regions produced by the display of FIG. 1.

Like reference numerals refer to like parts throughout the drawings.

Figure 5A:
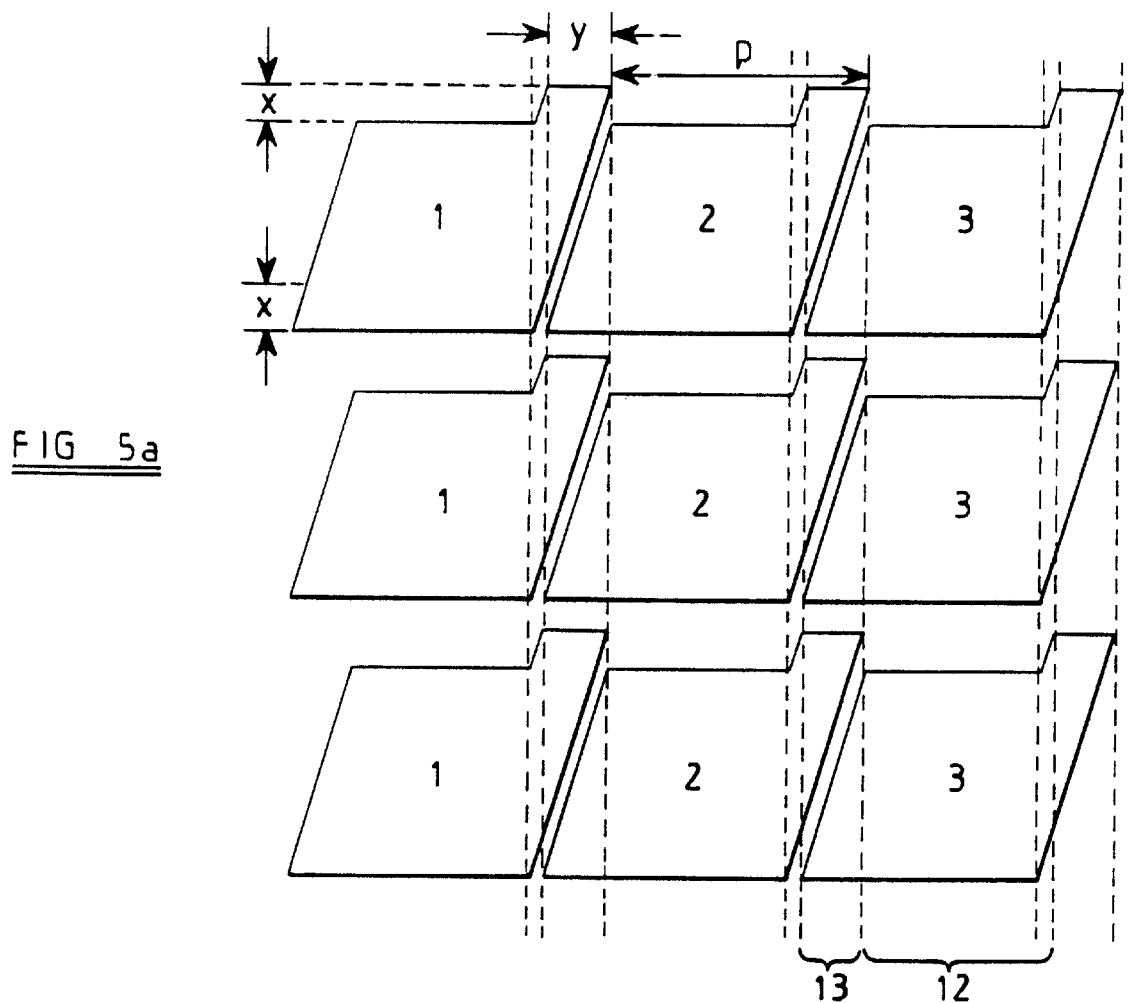
FIGS. 5a and 5b illustrate a novel pixel arrangement of an SLM constituting an embodiment of the invention.

FIGS. 5a and b illustrate a pixel arrangement for an SLM constituting an embodiment of the invention. The arrangement provides closer packing of the pixels such that the pixels can be disposed in the same horizontal row without the vertical offset required in arrangements of the type shown in FIG. 3. Nevertheless, horizontal and vertical gaps between the pixels are provided for routing of the gate and source lines.

The shape of each pixel comprises four regions labelled A, B, C and A'. The region A at the left of each pixel is shaped as a right angled triangle whose hypotenuse is inclined at an angle to the vertical which matches the inclination or slope of the right-hand edge of the pixel immediately to its left. The region B is rectangular so as to have a constant vertical extent and this is connected to the region C of parallelogram shape. Finally, another right angled triangular section is provided at A'.

The pixels are disposed such that there is a region 12 where there is no horizontal overlap between adjacent pixels and a region 13 where adjacent pixels overlap horizontally. In the region 13, the portion A of the right-hand pixel overlaps with the region A' of the left-hand pixel. Because the sloping edges of the regions A and A' match each other, the sum of the vertical extents of the adjacent pixels throughout the overlapping region 13 is constant and equal to the vertical extent of the rectangular region B. The transition between the region B and the region A' comprises the parallelogram shaped region C, which is also of constant vertical extent.

Figure 5B:
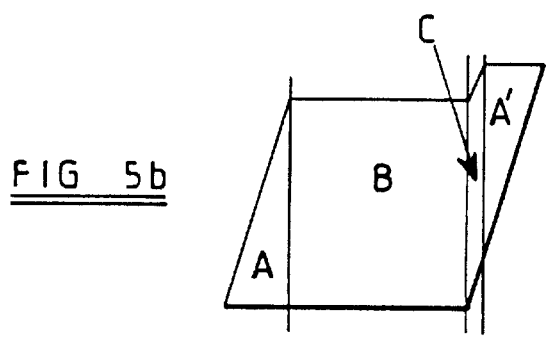
Figure 6:
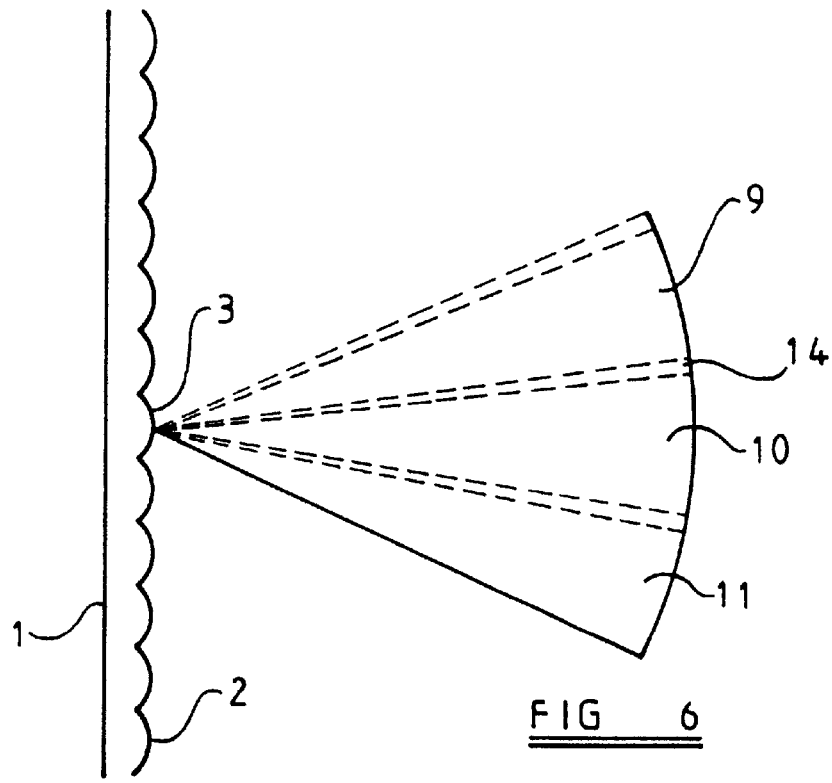
FIG. 6 illustrates illumination regions produced by an autostereoscopic 3D display using the layout illustrated in FIG. 5.

FIG. 6 illustrates the illumination produced by an autostereoscopic 3D display using the pixel arrangement shown in FIG. 5. Three adjacent viewing regions 9, 10 and 11 are produced but with overlap regions between adjacent pairs, for instance as shown at 14, corresponding to imaging by the lenticule 3 of the overlapping region 13. Thus, the display provides continuous and substantially uniform illumination with thin overlap regions, potentially containing high levels of cross talk, over which substantially constant illumination is maintained. The requirement that adjacent columns of pixels show the same view information so as to keep the illumination constant when an observer eye crosses the boundary between windows may, for instance, be met by the lateral observer tracking arrangement disclosed in EP 0 726 482.

The overlap region reduces viewing freedom in front of the display when adjacent columns of pixels do not show the same view information. The loss in viewing freedom is related to the size of the overlap shown at y in FIG. 5(a) in relation to the total pixel size shown at p in FIG. 5(a). In order to minimise the loss of viewing freedom, y should be much less than p.

Figure 7:
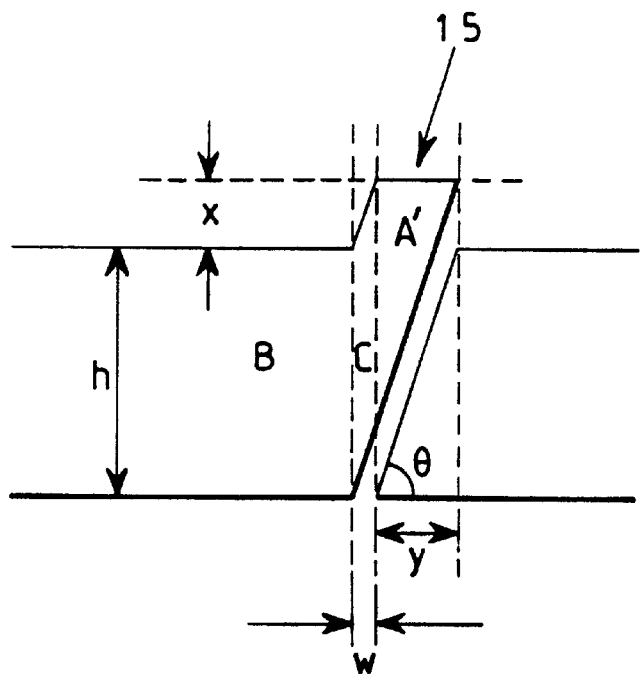
FIG. 7 illustrates some important dimensions of the pixel arrangement illustrated in FIG. 5.

FIG. 7 illustrates various dimensions of the pixel arrangement shown in FIG. 5a. The height of the rectangular portion B is indicated by h whereas the height or projection above the portion B of a "tab" portion indicated at 15 is designated x. The sides of the pixel are inclined at a slope angle $\theta$. The horizontal gap between adjacent pixels is designated w. These parameters are related by the following expressions:

$$x = w \tan(\theta)$$

$$y = \frac{h}{\tan(\theta)}$$

In order to give a good packing density and thus a high aperture ratio, the parameter x should be as small as possible. In order to maximise viewing freedom, y should be as small as possible. The slope angle $\theta$ is thus chosen to provide an acceptable compromise between these two conflicting requirements.

FIGS. 8a and b illustrate the effects on intensity at the boundary between two windows of manufacturing tolerances in positioning of the pixels. FIG. 8a illustrates this effect for a known pixel arrangement of the type shown in FIG. 3. The broken line 16 in the upper part of FIG. 8a illustrates the desired position for the left edge of the pixel 17 and the manufacturing error or tolerance resulting in an underlap is indicated by $\delta$.

The graph at the middle part of FIG. 8a illustrates how the intensity varies at the boundary between the windows as the tolerance $\delta$ varies either side of zero corresponding in perfect positioning in terms of intensity where "1" is the desired constant intensity. Thus, if the pixels are slightly misplaced during manufacture of the SLM, the viewing window boundary will either have double the intensity or zero intensity depending on whether the tolerance is such as to create an overlap or an underlap. However, the size of the eye spot blurs this somewhat.

Figure 3:
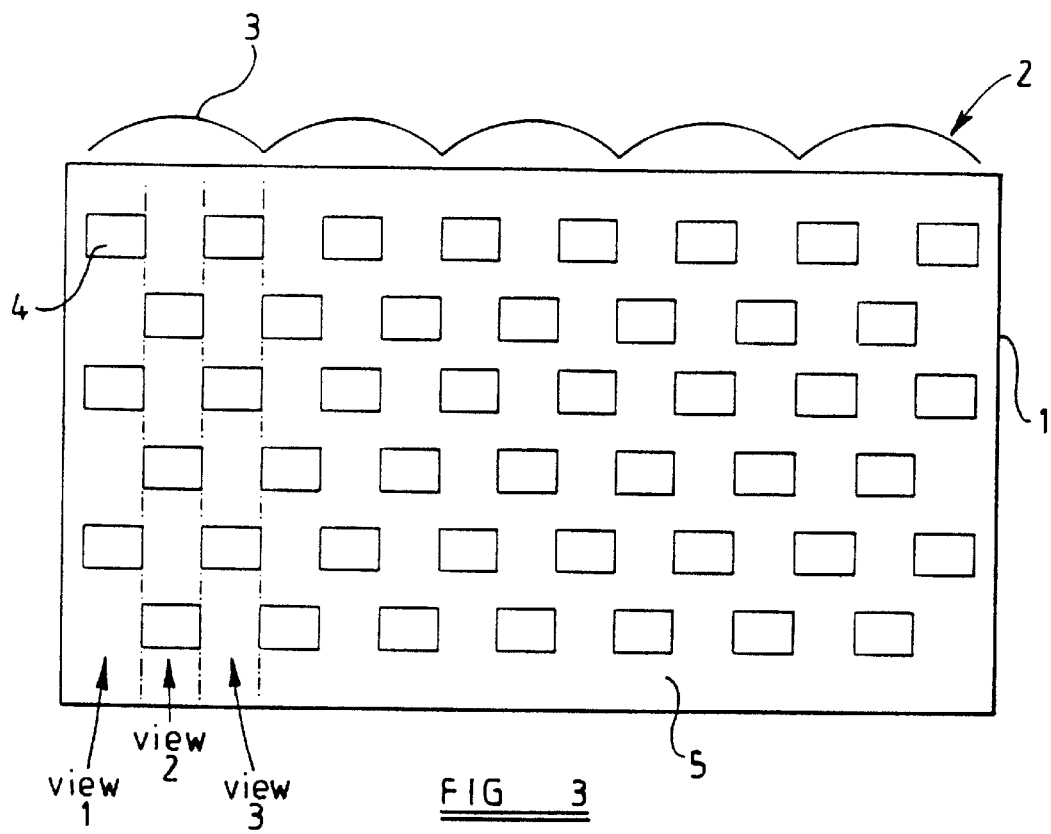
FIG. 3 illustrates a display comprising another known type of SLM.
Figure 4:
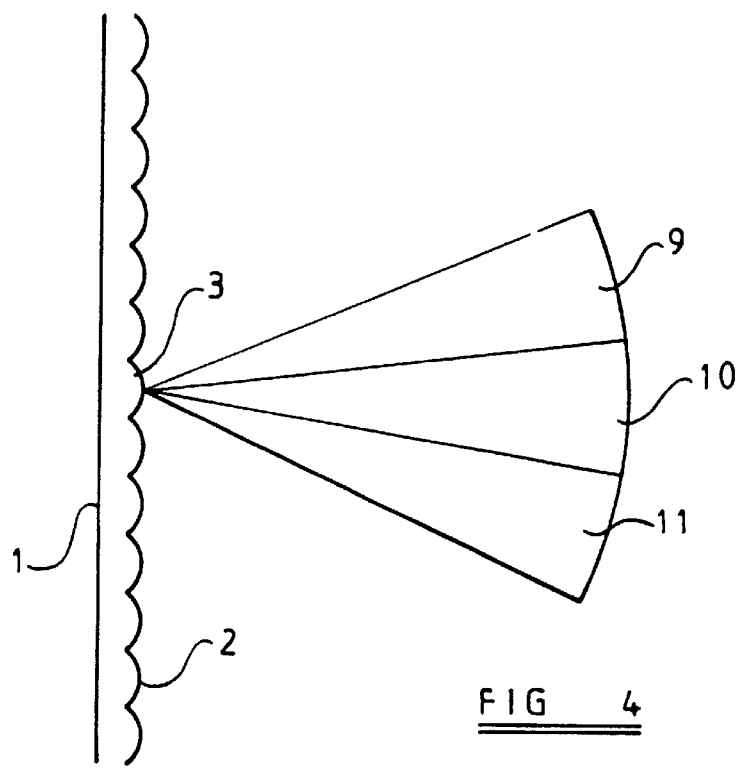
FIG. 4 illustrates illumination regions produced by the display of FIG. 3.

FIG. 9 illustrates how the lenticular screen 2 of the display images the pupil 18 to an eye spot 19 of finite size at the pixel plane 20 of the SLM. For cylindrically converging lenticular screens 2, the pupil is in fact imaged to a vertical strip and this eye spot 19 covers the region of the SLM from which the pupil of the observer eye collects light. Thus, the incorrect pixel positioning is perceived as a rise or fall in intensity with the magnitude thereof given by the relative sizes of the eye spot and the degree of mismatch. However, the eye is very sensitive to small intensity changes, especially when the observer is not at the ideal widow plane. Intensity fluctuations less than 1% are visible so that the required tolerance of positioning the pixels for the arrangement shown in FIG. 3 is very high and is typically of the order of 0.1 micrometers.

The graph at the middle part of FIG. 8a shows the variation of intensity with horizontal pixel positioning tolerance for an ideal "point" eye spot by means of the broken line curve. The actual variation for an eye spot of finite size is illustrated by the unbroken line curve. The graph at the lower part of FIG. 8a illustrates the variation in intensity as an observer moves laterally in the window plane with the broken and unbroken curves representing intensity for ideal and finite eye spots, respectively.

FIG. 8b illustrates the effect of mismatch for the pixel arrangement shown in FIG. 5a. In this case, for the ideal eye spot, the viewing window boundary intensity drops linearly as the mismatch approaches the overlap size. For the actual finite eye spot, the rate of fall is slower so that the tolerance in positioning the pixels may be relaxed. For instance, considering a specific numerical example, if the eye spot is approximately 10 microns in diameter, the overlap width is 3 microns, and the limit of illumination drop which can be tolerated is 1%, then a mismatch of about 15% of the overlap width can be allowed and represents about 0.5 microns in this example. Again, the lower part of FIG. 8b illustrates the variation of intensity with lateral position of the observer for the same underlap shown in the upper parts of FIGS. 8a and 8b. The intensity variation is substantially reduced as compared with the lower part of FIG. 8a. Thus, the arrangement shown in FIG. 5a permits manufacturing tolerances which are greater than those permitted in the arrangement of FIG. 3 for similar performance.

FIG. 10 illustrates a pixel arrangement which differs from that shown in FIG. 5a in that the tab 15 provided at one end of each pixel is replaced by two tabs 21 and 22 at opposite ends of each pixel. Thus, the tab region is shared between adjacent pixels in the overlap region and, if this is done equally, the tab height becomes x/2 i.e. half the tab height shown in FIG. 7. The performance of this arrangement is the same as that of the arrangement shown in FIG. 5a.

Where the SLM is embodied as an LCD display with a diagonal size of 8 to 10 inches, the pixels typically have a width and height of approximately 100 micrometers. Separations between pixels vary significantly with different display technologies but a conductor width of 10 to 20 micrometers is possible in more recent displays. If this is taken as the required horizontal gap w, then the overlap region would be undesirably large. However, FIG. 11 illustrates an arrangement which may be used to overcome this difficulty.

In FIG. 11, each pixel is divided into two subpixels such as 23 and 24 by a diagonal dividing line and the subpixels are offset vertically with respect to each other so as to form a gap 25 which can be made sufficiently large to accommodate the conductor electrode such as a vertical electrode or "source line" 39. The slopes of the opposing edges of the subpixels are the same and, because there is no horizontal offset between subpixels, the vertical aperture size is maintained constant across the centre of the pixel. Thus, the gap 25 in the pixel is effectively invisible and causes no undesirable visual artefacts in 3D displays using cylindrical components. Routing of a horizontal electrode or "gate line" is shown at 40. The vertical space taken up by dividing the pixel into subpixels can be small because the slope of the dividing line may be relatively shallow, for instance 45°, as viewing freedom is not compromised.

With the electrodes routed in this way, the pixels may be moved much closer together so that the gap w can be significantly reduced, remaining only to insulate the pixel pad electrodes from each other and to avoid fringing field effects in the LCD between horizontally adjacent pixels. As shown in FIG. 11, the slopes of the diagonal gaps such as 25 are reversed in alternate rows so as to provide shorter connection paths for the vertical conductor lines.

In order to permit observer tracking without moving parts for instance as disclosed in EP 0 726 482, the condition $y<p/2$ should be met. This condition is derived from how close an eye may approach a pixel boundary while the other eye is moving between two pixels in a three window tracking system. The condition $y \leq p/8$ is probably desirable for a high quality practical system.

In the case of a typical example, $h=p=100$ micrometers, the width of the conductor lines is 15 micrometers and the remaining gap w between pixels is 3 micrometers. A slope angle $\theta$ of approximately 85° gives an overlap region whose width y is 9 micrometers and a tab height x of 34 micrometers. Using the arrangement shown in FIG. 11, the slope angle of the dividing line between subpixels is approximately 53° giving a vertical offset of 25 micrometers between the subpixels 23 and 24. With a vertical gap between adjacent pixels of 15 micrometers for the gate lines, this provides an aperture ratio of 67% for the arrangement shown in FIG. 11 compared with 43.5% for the arrangement shown in FIG. 3. The arrangement shown in FIG. 11 thus provides a 54% improvement in aperture ratio.

Figure 12:
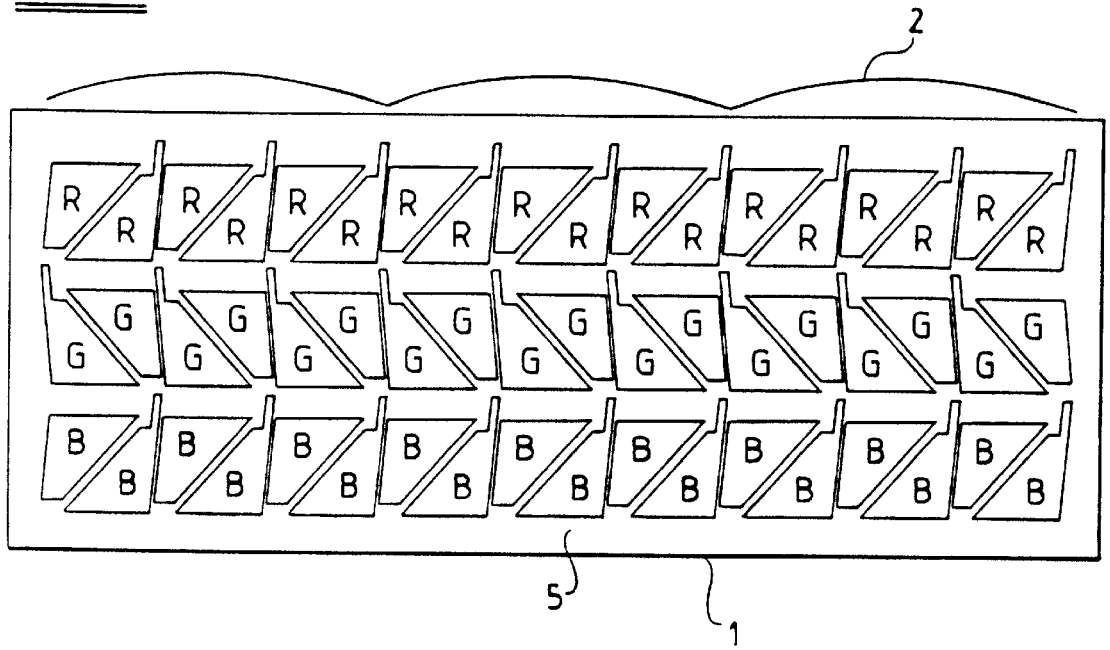
FIG. 12 illustrates an autostereoscopic 3D display using the pixel layout illustrated in FIG. 11.

In order to provide a full colour display, red, green and blue pixels must be arranged so that the pixel groups for each view contain sufficient of each for correct colour balance. FIG. 12 illustrates the use of an SLM 1 with the pixel arrangement shown in FIG. 11 in association with the lenticular screen 2 so as to provide a three view autostereoscopic 3D display. The pixels of the top row are provided with a red filter, the pixels of the middle row are provided with a green filter and the pixels of the bottom row are provided with a blue filter. This pattern is repeated vertically and horizontally, FIG. 12 merely showing a small portion of the display.

In some applications, a small gap between viewing windows can be tolerated. For instance, this may be possible in 3D autostereoscopic displays provided with mechanical observer tracking which prevents the observer eye spots from crossing a pixel boundary by laterally displacing the parallax element, such as the lenticular screen 2, to keep the eye spot in the pixel centre.

The presence of a small gap between adjacent windows manifests itself as a thin dark region which is imaged to a dark strip down the centre of an observer's face. Such a region is not therefore visible and is unnoticed by the observer. In order to keep the gap invisible, it must be as small as possible and the space required for a vertical conductor line might cause too wide a gap between the windows when imaged.

Figure 13:
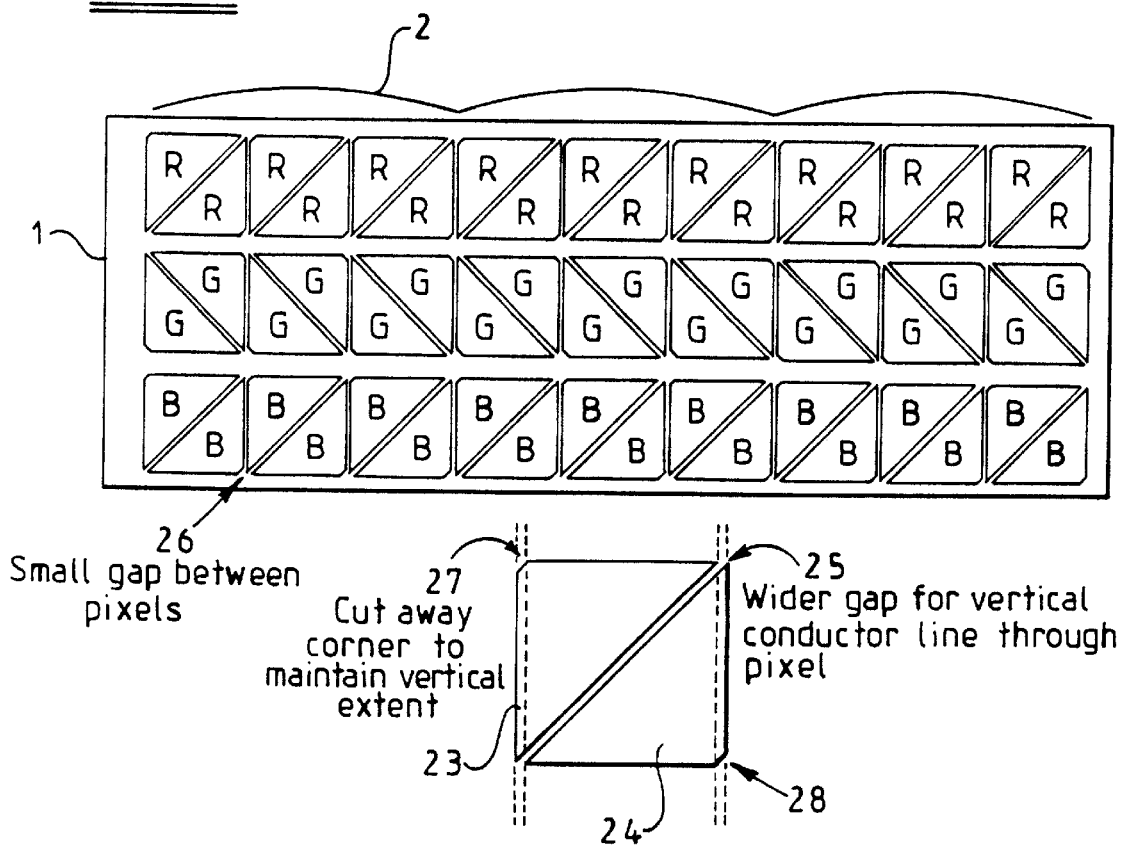
FIG. 13 illustrates another 3D autostereoscopic display constituting an embodiment of the invention and having another pixel arrangement.

In order to overcome this problem, the arrangement shown in FIG. 13 may be used. The SLM 1 comprises rows and columns of pixels which are spaced closer together. However, the pixel columns are separated from each other by a small vertical gap shown at 26. Each pixel is divided into subpixels 23 and 24 so as to provide a wider gap 25 for accommodating the vertical conductor line. In order to provide a pixel whose effective height is constant with lateral position, the corners 27 and 28 are "cut away" so as to maintain constant vertical extent.

Another example of a display which can cope with small gaps between pixel columns is a display using a parallax barrier as the parallax element or "view defining optic". The eye spot is generally so large with a parallax barrier that a small mismatch between the pixels is not noticeable to the observer if the mismatch is much less than this size. The SLM arrangement shown in FIG. 13 is therefore suitable for such a display. Because the gap between adjacent pixels has to be smaller than the width of a typical current conductor line, the conductor lines pass through the gaps 25 between the subpixels 23 and 24 of the pixels.

Figure 14:
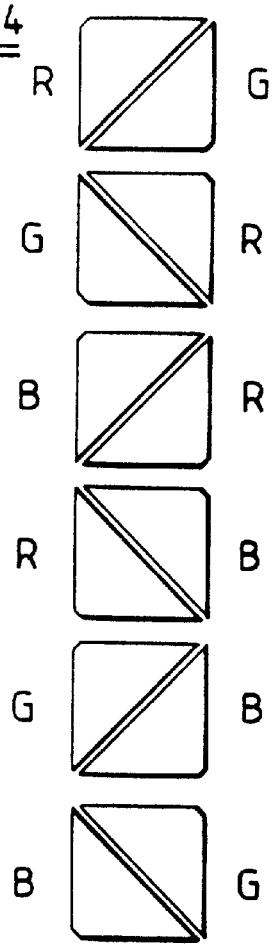
FIG. 14 illustrates an alternative colour filter arrangement for the display of FIG. 13.

The arrangement shown in FIG. 13 uses the same colour filter arrangement as described with reference to FIG. 12. However, it is not necessary for both pixels to have the same colour filter, although corresponding colour halves should not be displaced far. FIG. 14 illustrates an example of an arrangement in which the subpixels have different colour filters indicated by R for red, G for green and B for blue.

With the arrangement shown in FIG. 13, it is possible for all the conductors which are required to extend vertically to be accommodated in the gaps 25 between the subpixels 23 and 24. The gaps between adjacent pixels may therefore be minimised so as to provide an SLM 1 of very high aperture ratio with minimal horizontal gap between adjacent pixels.

Figure 15A:
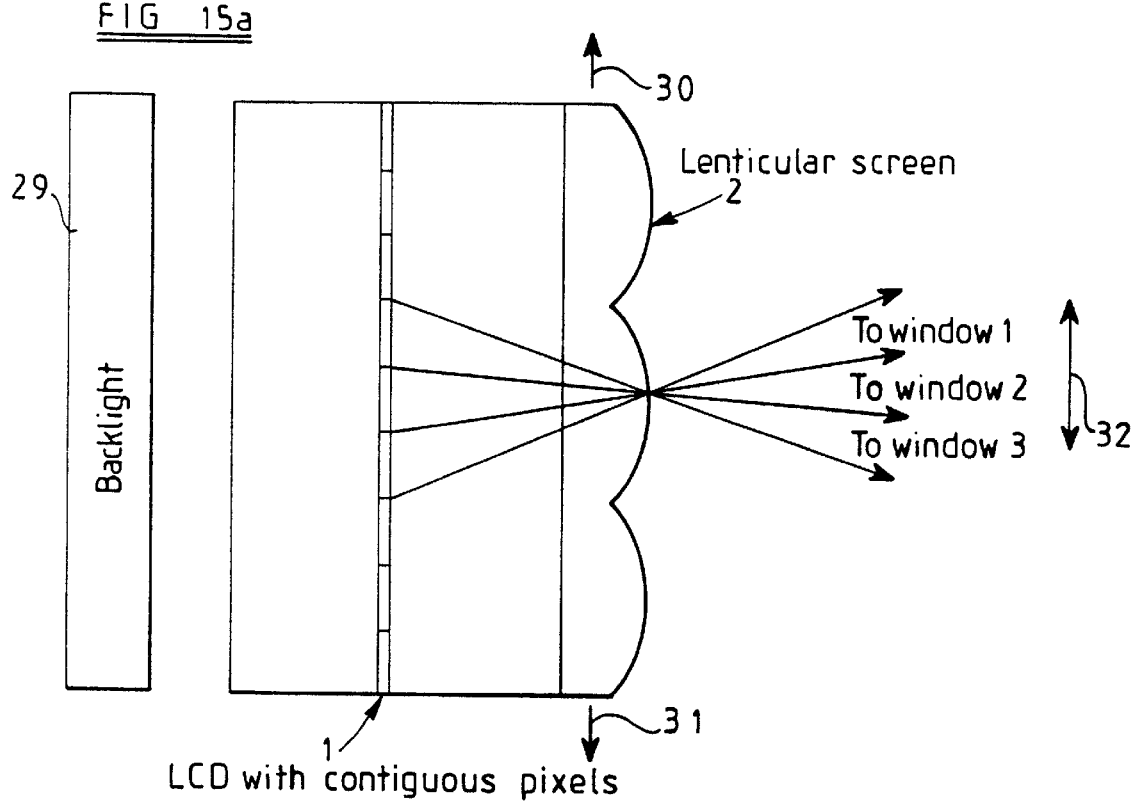
Figure 15B:
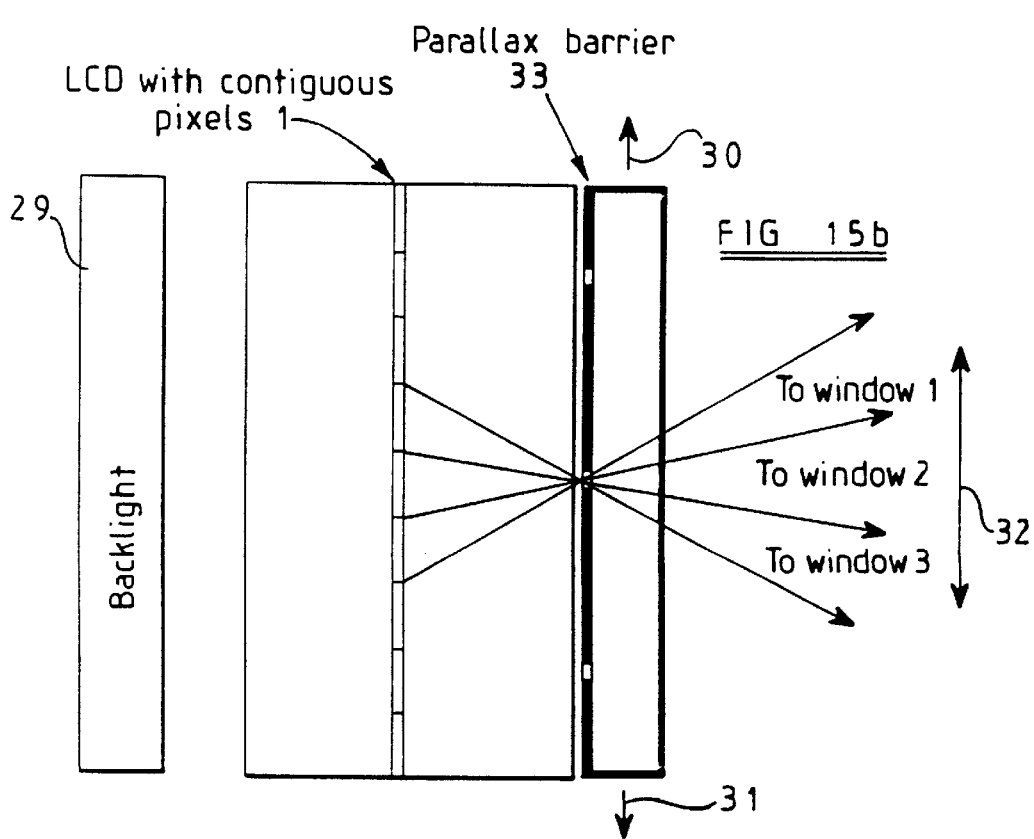

FIGS. 15a, b and c illustrate autostereoscopic 3D displays having mechanical observer tracking using SLMs of the type illustrated in FIG. 13. The displays comprise a backlight 29 and a parallax device which is moveable over the surface of the SLM 1 in response to a signal from a tracker device, such as a Dynasight (TM) infrared tracker. Such systems need only provide two viewing windows for displaying only a left image and a right image because the observer is prevented from leaving the two windows by the dynamic tracking system. FIG. 15a illustrates a display in which the parallax device is the lenticular screen 2 which is movable in the directions of arrows 30 and 31 so as to move the viewing windows in the directions indicated by the arrow 32. The display of FIG. 15b differs from that of FIG. 15a in that the lenticular screen 2 is replaced by a front parallax barrier 33. The display shown in FIG. 15c differs from that shown in FIG. 15b in that the front parallax barrier 33 is replaced by a rear parallax barrier 34 disposed between the backlight 29 and the LCD 1. In all three displays, the SLM 1 comprises an LCD having pixels which are laterally contiguous so as to provide contiguous viewing windows.

Figure 16A:
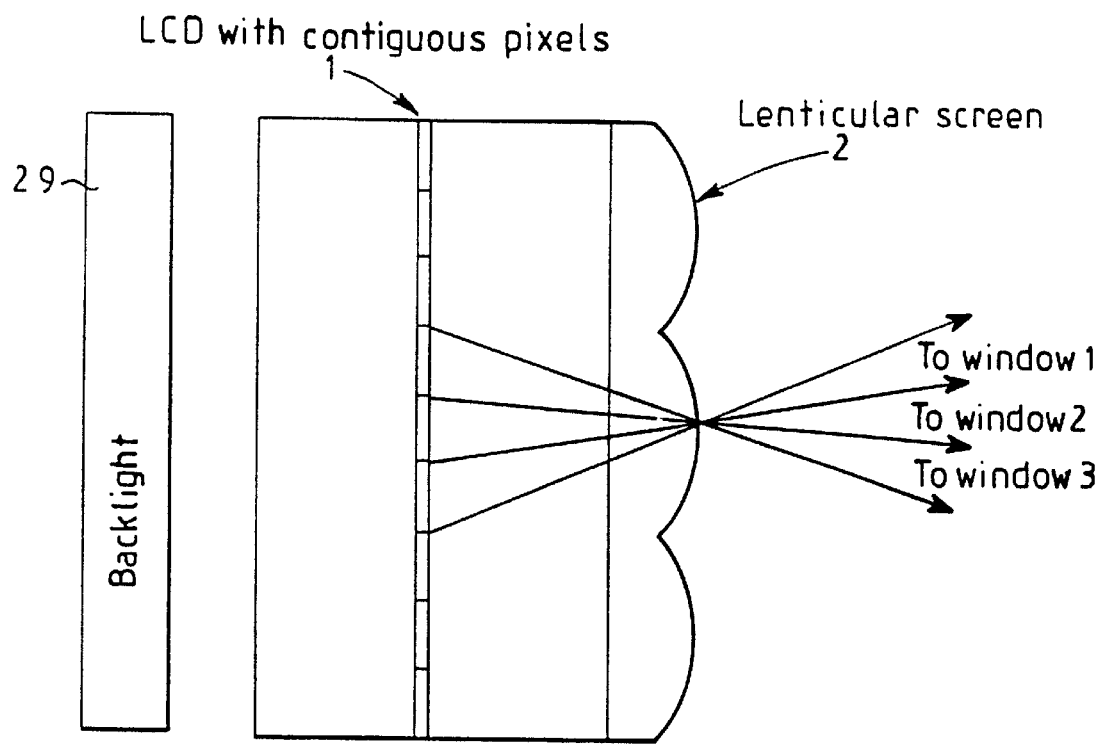
FIG. 16 shows a display constituting an embodiment of the invention for providing observer tracking by rotation of the whole display.
Figure 16B:
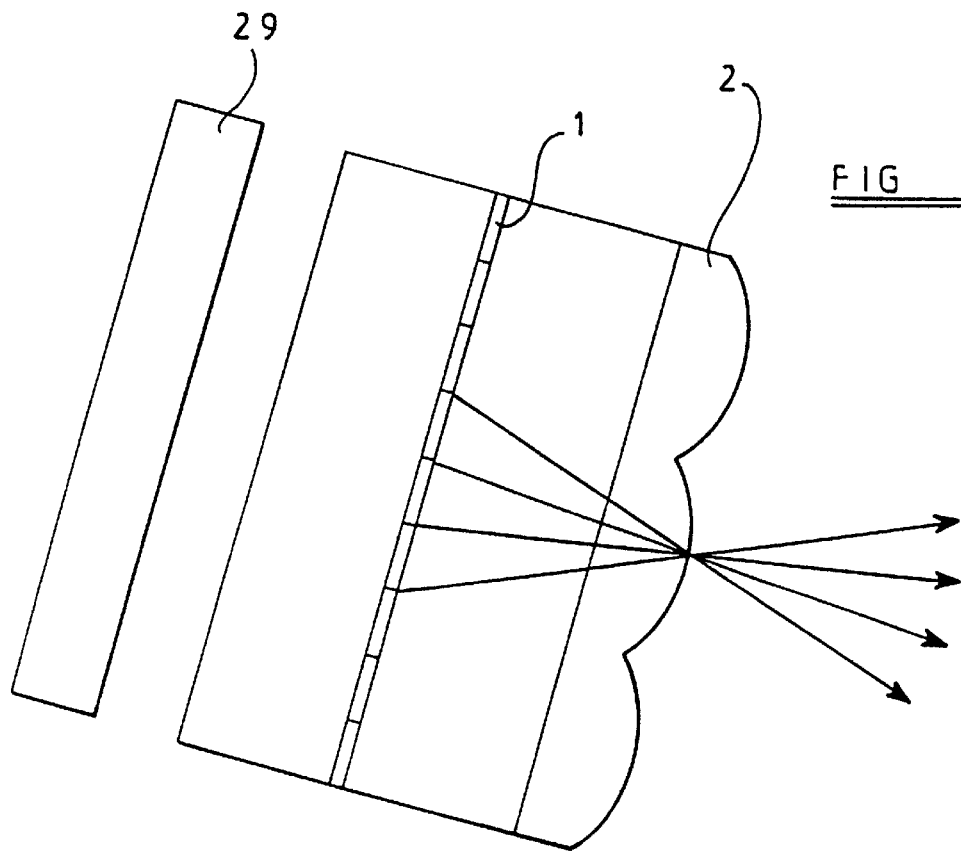

FIG. 16 illustrates another observer tracking technique for a display of the type shown in FIG. 15a. In this case, the lenticular screen 2 is fixed and the whole display rotates in response to an observer position determining system.

Figure 17:
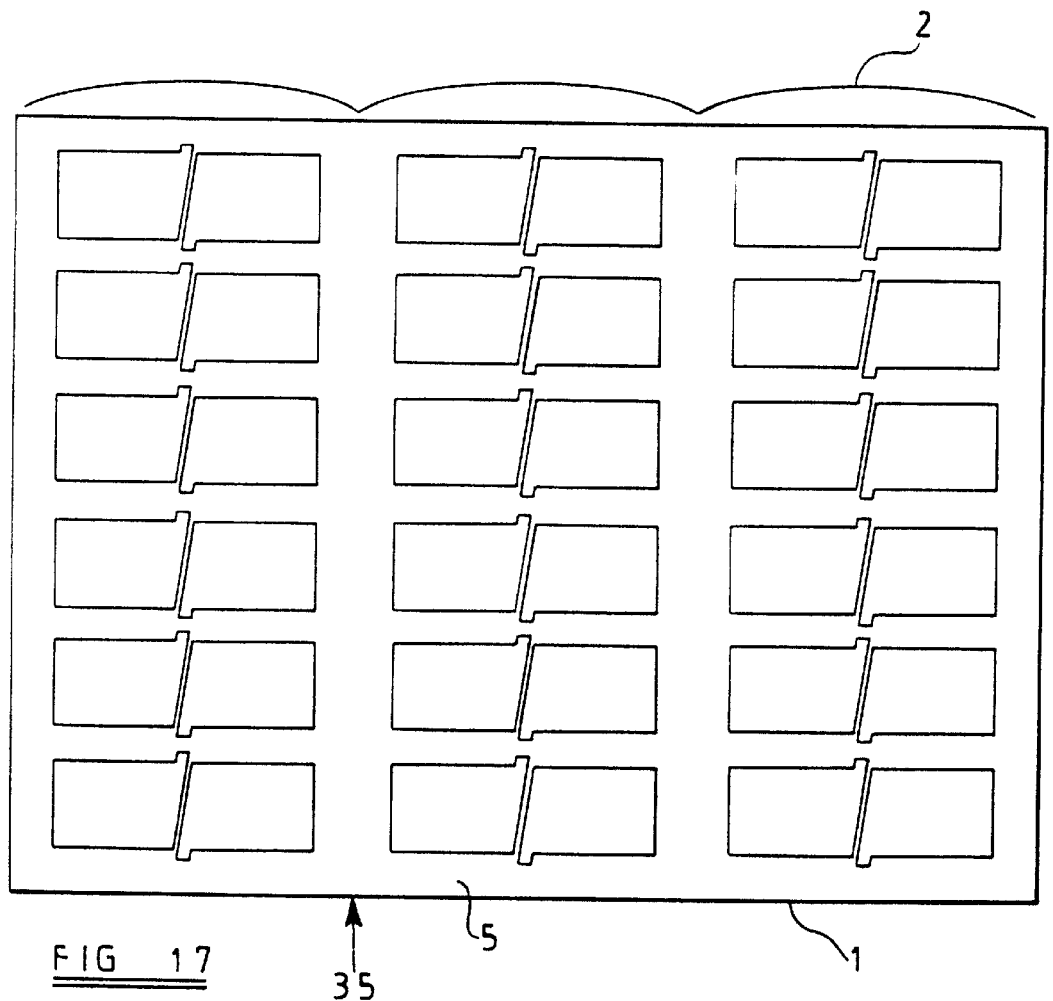
FIG. 17 illustrates a pixel arrangement for use in a mechanical observer tracking display.

FIG. 17 illustrates a display of the type shown in FIG. 10 but with the pixels arranged as pairs of overlapping columns below respective lenticules of the lenticular screen 2. The pairs of columns are separated by continuous vertical black strips, such as 35, of the black mask 5. This arrangement reduces cross-talk permeation while maintaining viewing freedom and maximising display resolution. Cross-talk occurs because of light leaking into a viewing window from neighbouring regions. By providing a dark space 35 between the pairs of pixels, light leaks in from one side of the viewing window only. Also, the black mask areas can be used for the routing of conductors. By using the pixel shapes with the tabs divided between the adjacent pixels, the pixel areas are maintained equal, which is desirable for matched pixel capacitance in the display.

Figure 18:
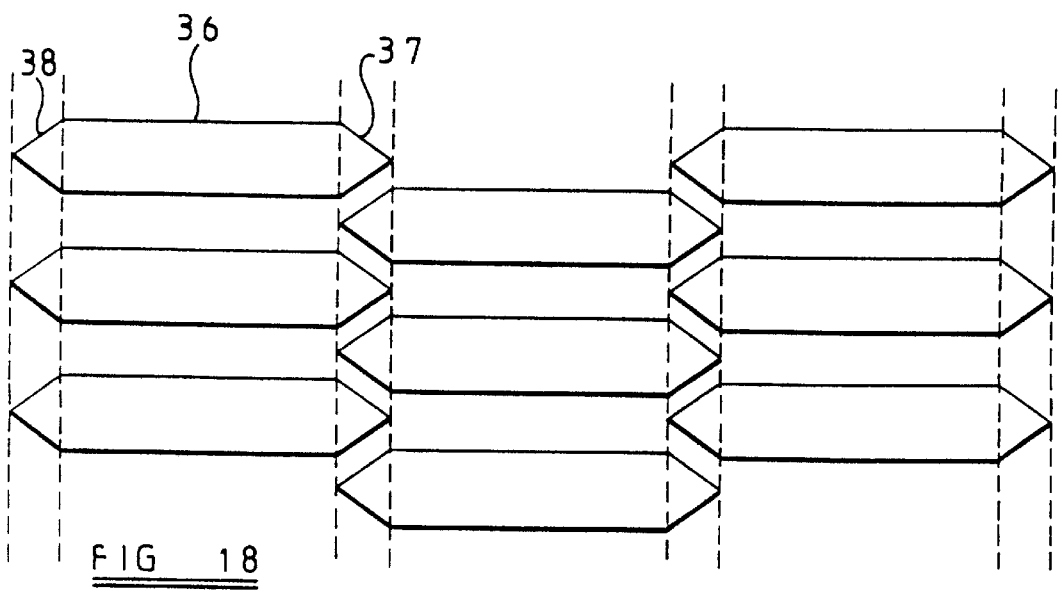
FIG. 18 illustrates another pixel layout for an SLM constituting an embodiment of the invention.

FIG. 18 illustrates another pixel arrangement for an SLM. Each of the pixels is of hexagonal shape and comprises a rectangular central portion 36, which does not overlap with the adjacent pixels in the same row together with triangular end portions 37 and 38 which do overlap with the adjacent pixels in the same row. Adjacent pairs of pixels in the same row are vertically offset with respect to each other. Again, in each row, there is a constant vertical extent or aperture across the whole row including the overlapping triangular regions.

Figure 19:
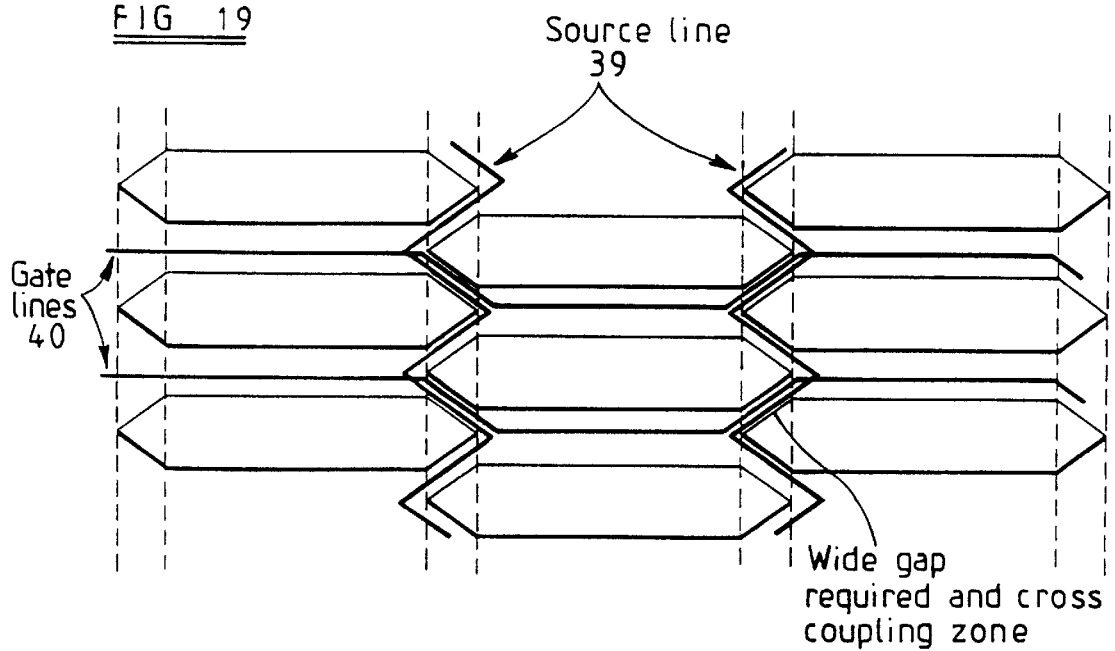
FIG. 19 illustrates the layout of FIG. 18 showing a possible arrangement of addressing electrodes.

FIG. 19 illustrates a possible arrangement of routing of source lines 39 and gate lines 40. Such an arrangement requires that, in certain gaps between adjacent pixels, the gate and source lines will run parallel to each other. Thus requires a relatively large gap and possibly leads to an overlap region which is too large in comparison with the central width of the windows. Further, because the conductors run alongside each other, some cross-coupling will take place between the signals carried by the conductors, thus leading to degradation in signal quality.

Figure 20:
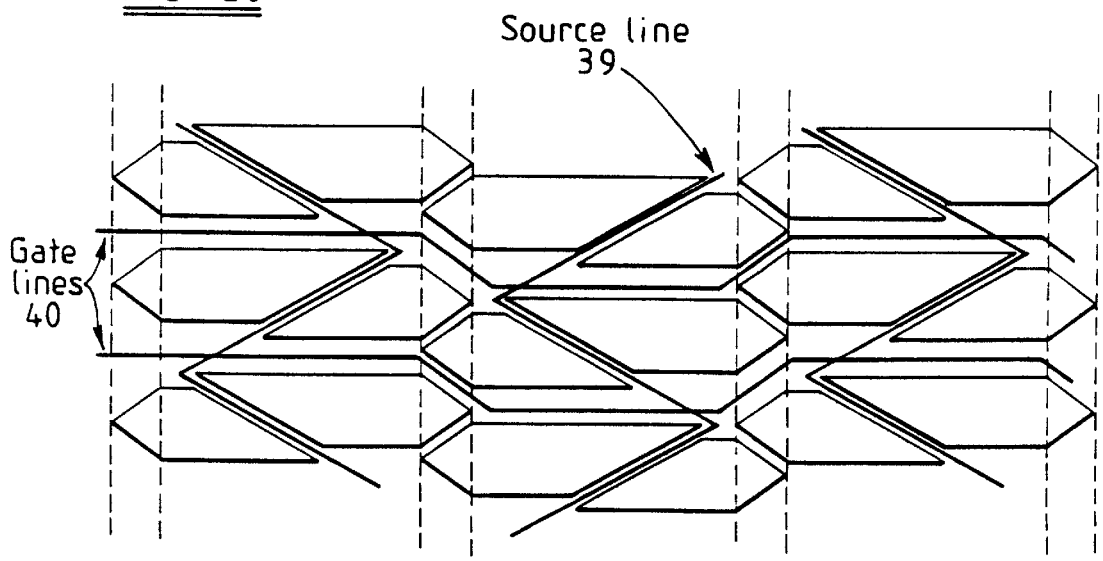
FIG. 20 illustrates a pixel layout of the type shown in FIGS. 18 and 19 but modified to provide an improved addressing electrode layout.

FIG. 20 illustrates an alternative arrangement in which the source lines 39 pass through the pixel apertures in gaps created by dividing each pixel into subpixels as described hereinbefore.

This arrangement is limited because the gate lines must pass through gaps between the pixels. When the width of the conductors, for instance 15 to 20 micrometers, is taken into account with a typical pixel pitch of approximately 100 micrometers, the overlap region cannot be made sufficiently small compared to the central part of the windows for good viewing freedom for observer tracking displays comprising LCD panels of about 10 inches diagonal size. Thus, this arrangement is more appropriate for panels with large pixel pitches, for instance large diagonal size SLMs.

In thin film transistor type LCD displays, each pixel is driven by a thin film transistor fabricated on the display substrate. The gate lines are connected to the transistor gates and the source lines are connected to the transistor sources. The pixel pad electrode is connected to the transistor drain. The positioning and number of thin film transistors is important for the fabrication of such display panels and for cost. The display may also be embodied in other active matrix technology, such as thin film diodes and metal-insulator-metal structures.

Figure 21:
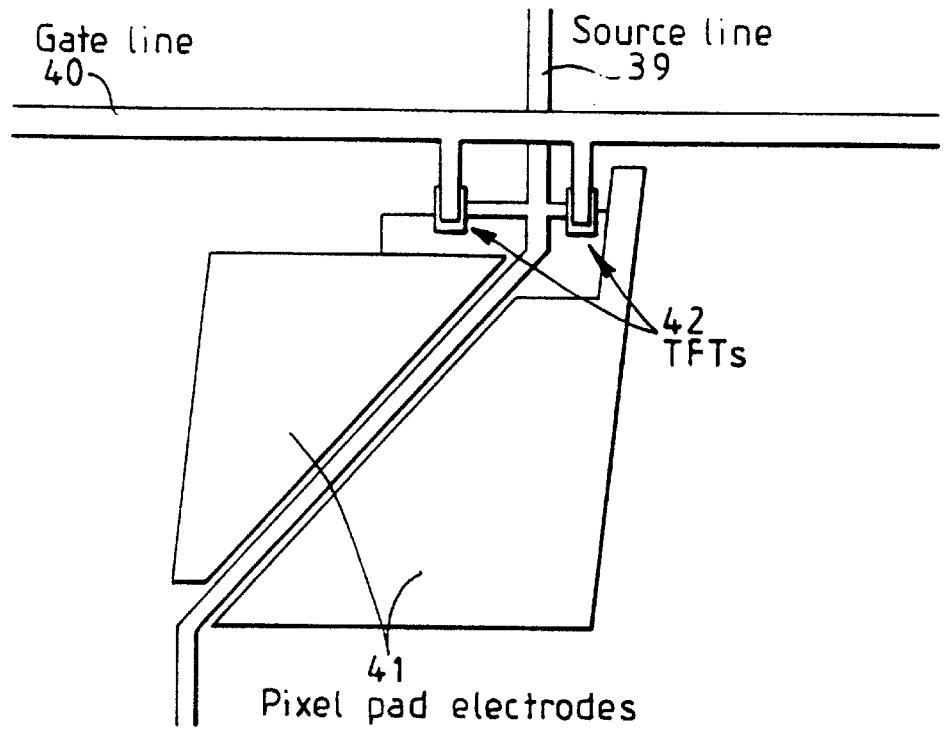
FIG. 21 illustrates a pixel driving arrangement using two thin film transistors per pixel.
Figure 22:
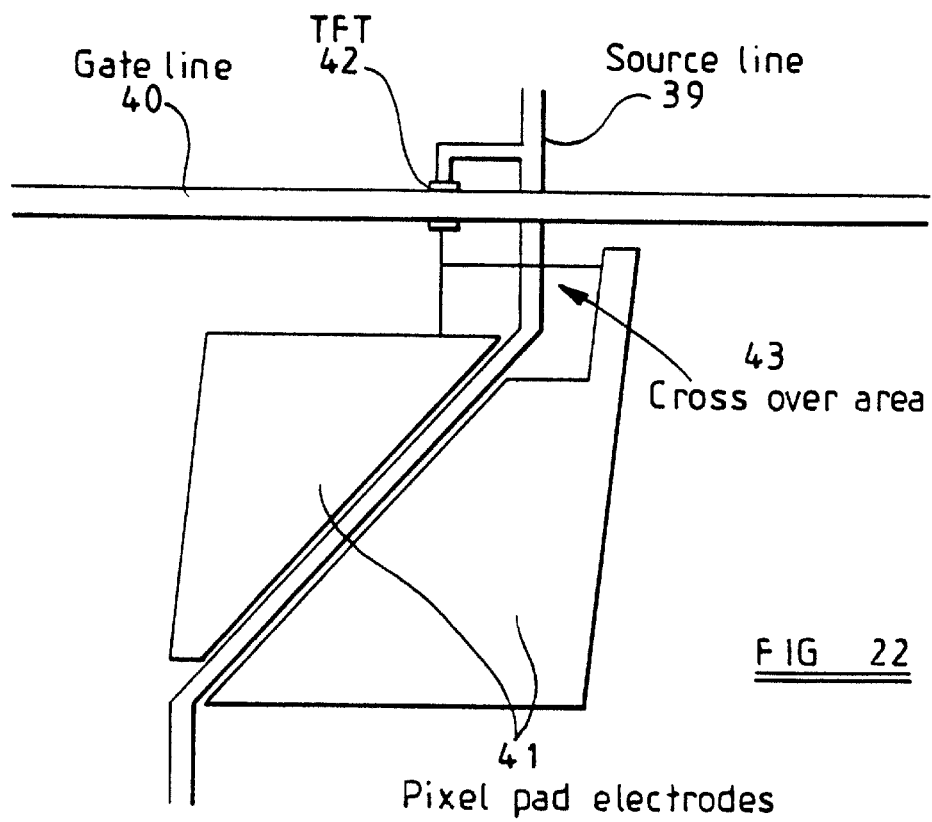
FIG. 22 illustrates a pixel drive arrangement using a single thin film transistor per pixel.

FIG. 21 illustrates a first arrangement for driving pixels which are divided into subpixels as shown in FIGS. 11 to 14 and 20. In this arrangement, the pixel pad electrodes 41 are driven by respective thin film transistors (TFTs) 42 so that there are two transistors per pixel. However, for cost and manufacturing yield, it will be desirable to use a single thin film transistor per pixel as shown in the arrangement of FIG. 22. In this arrangement, one of the subpixel pad electrode connections crosses the vertical source line 39 and so has to be insulated therefrom, for instance by a suitable dielectric layer. Although some capacitance will be generated in the cross-over area 43, this may be made much less than the pixel capacitance so that the cross-over capacitance is unimportant and the single transistor option is feasible.

Figure 23:
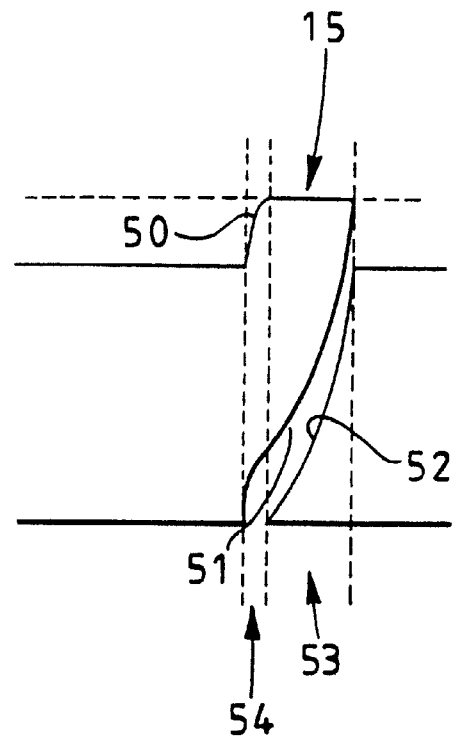
FIG. 23 illustrates another pixel arrangement of an SLM constituting an embodiment of the invention.

Although the arrangements described hereinbefore have included pixels having straight edges, particularly the inclined adjacent edges of horizontally adjacent pixels, this is not necessary. For instance, FIG. 23 illustrates an arrangement which is similar to that shown in FIGS. 5a, 5b and 7 but which differs in that the edges 50, 51 and 52 are curved. The curves are such that the combined vertical extent of the pixels in the overlap region 53 is constant and equal to the vertical extent or height in the non-overlapping region including the transition region 54.

What is claimed is:

1. A spatial light modulator including a plurality of light output apertures arranged as rows extending in a first direction and columns extending in a second direction substantially perpendicular to the first direction, wherein at least one first one and at least one second one of the apertures overlap so as to have first and second overlapping regions which overlap one another in the second direction within a row, respectively, such that the height in the second direction of each of the first and second overlapping regions varies with respect to position along the first direction while the sum of the heights of the first and second overlapping regions remains substantially constant.

2. A modulator as claimed in claim 1, wherein at least one of the first and second apertures has a first non-overlapping portion whose height is substantially constant and is substantially equal to the sum of the heights of the first and second overlapping regions.

3. A modulator as claimed in claim 1, wherein each of the first and second overlapping regions is of right-angled triangular shape.

4. A modulator as claimed in claim 1, wherein each first and second apertures are offset with respect to each other in the second direction.

5. A modulator as claimed in claim 1, wherein each first and second apertures are separated by a gap containing an addressing electrode.

6. A modulator as claimed in claim 1, wherein the apertures correspond to a plurality of picture elements and a plurality of picture elements, each of which comprises a first sub-picture element defined by one of the first apertures and a second sub-picture element defined by one of the second apertures.

7. A modulator as claimed in claim 5, further comprising a plurality of picture elements, each of which comprises a first sub-picture element defined by one of the first apertures and a second sub-picture element defined by one of the second apertures, wherein the gaps are inclined with respect to the second direction in opposite directions in adjacent rows of the picture elements.

8. A modulator as claimed in claim 6, further comprising an addressing transistor for addressing the first and second sub-elements of each picture element.

9. A modulator as claimed in claim 6, further comprising first and second addressing transistors for addressing the first and second sub-elements, respectively, of each picture element.

10. A modulator as claimed in claim 6, wherein the picture elements are arranged as groups of N adjacent columns, wherein N is an integer greater than 1, and adjacent picture elements disposed in each row and in adjacent columns of each group overlap one another in the second direction within a row so as to have the first and second overlapping regions and first non-overlapping regions, the height of each picture element being substantially constant throughout the first non-overlapping regions and being substantially equal to the sum of the heights of the adjacent picture elements throughout the first and second overlapping regions.

11. A modulator as claimed in claim 10, wherein adjacent picture elements disposed in each row and in adjacent columns of adjacent groups overlap in the first direction so as to have fourth overlapping regions and the sum of the heights of the adjacent picture elements of the adjacent groups throughout the fourth overlapping regions is substantially equal to the height of the picture elements in the second non-overlapping regions.

12. A modulator as claimed in claim 10, wherein each picture element has a shape derived from a combined shape comprising: a rectangular portion having first and second sides aligned in the first direction and third and fourth sides aligned in the second direction; a first right-angled triangular portion having a first side coincident with the third side of the rectangular portion, a second side extending co-linearly from the first side of the rectangular portion, and a hypotenuse inclined at a first predetermined angle to the second direction; a parallelogram portion having a first side coincident with the fourth side of the rectangular portion, a second side opposite the first side, and third and fourth sides parallel to the hypotenuse of the first triangular portion; and a second right-angled triangular portion having a first side coincident with the second side of the parallelogram portion, a hypotenuse parallel to the hypotenuse of the first triangular portion and a third side which is parallel to the second side of the rectangular portion.

13. A modulator as claimed in claim 11, wherein each picture element has a shape derived from a combined shape comprising: a rectangular portion having first and second sides aligned in the first direction and third and fourth sides aligned in the second direction; a first right-angled triangular portion having a first side coincident with the third side of the rectangular portion, a second side extending co-linearly from the first side of the rectangular portion, and a hypotenuse inclined at a first predetermined angle to the second direction; a parallelogram portion having a first side coincident with the fourth side of the rectangular portion, a second side opposite the first side, and third and fourth sides parallel to the hypotenuse of the first triangular portion; and a second right-angled triangular portion having a first side coincident with the second side of the parallelogram portion, a hypotenuse parallel to the hypotenuse of the first triangular portion and a third side which is parallel to the second side of the rectangular portion.

14. A modulator as claimed in claim 12, wherein the width of the parallelogram portion in the first direction is substantially equal to the width of the gap in the first direction between each picture element and a picture element adjacent the second triangular portion.

15. A modulator as claimed in claim 13, wherein the width of the parallelogram portion in the first direction is substantially equal to the width of the gap in the first direction between each picture element and a picture element adjacent the second triangular portion.

16. A modulator as claimed in claim 10, wherein each picture element has a shape derived from a combined shape comprising: a rectangular portion having first and second sides aligned in the first direction and third and fourth sides aligned in the second direction; a first parallelogram portion having a first side coincident with the fourth side of the rectangular portion, a second side opposite the first side, and third and fourth sides inclined at a second predetermined angle to the second direction; the first right-angled triangular portion having a first side coincident with the second side of the first parallelogram portion, a hypotenuse parallel to the third and fourth sides of the first parallelogram portion and a third side which is parallel to the second side of the rectangular portion; a second parallelogram portion having a first side coincident with the third side of the rectangular portion, a second side opposite the first side, and third and fourth sides parallel to the third and fourth sides of the first parallelogram portion; and a second right-angled triangular portion having a first side coincident with the second side of the second parallelogram portion, a hypotenuse parallel to the third and fourth sides of the first parallelogram portion and a third side which is parallel to the second side of the rectangular portion.

17. A modulator as claimed in claim 11, wherein each picture element has a shape derived from a combined shape comprising: a rectangular portion having first and second sides aligned in the first direction and third and fourth sides aligned in the second direction; a first parallelogram portion having a first sides coincident with the fourth side of the rectangular portion, a second side opposite the first side, and third and fourth sides inclined at a second predetermined angle to the second direction; a first right-angled triangular portion having a first side coincident with the second side of the first parallelogram portion, a hypotenuse parallel to the third and fourth sides of the first parallelogram portion and a third side which is parallel to the second side of the rectangular portion; a second parallelogram portion having a first side coincident with the third side of the rectangular portion, a second side opposite the first side, and third and fourth sides parallel to the third and fourth sides of the first parallelogram portion; and a second right-angled triangular portion having a first side coincident with the second side of the second parallelogram portion, a hypotenuse parallel to the third and fourth sides of the first parallelogram portion and a third side which is parallel to the second side of the rectangular portion.

18. A modulator as claimed in claim 16, wherein the width of each of the first and second parallelogram portions in the first direction is substantially equal to half the width of the gap in the first direction between each adjacent pair of picture elements.

19. A modulator as claimed in claim 17, wherein the width of each of the first and second parallelogram portions in the first direction is substantially equal to half the width of the gap in the first direction between each adjacent pair of picture elements.

20. A modulator as claimed in claim 12, wherein the shape is derived by dividing the combined shape obliquely with respect to the second direction so as to define the first and second apertures.

21. A modulator as claimed in claim 13, wherein the shape is derived by dividing the combined shape obliquely with respect to the second direction so as to define the first and second apertures.

22. A modulator as claimed in claim 16, wherein the shape is derived by dividing the combined shape obliquely with respect to the second direction so as to define the first and second apertures.

23. A modulator as claimed in claim 17, wherein the shape is derived by dividing the combined shape obliquely with respect to the second direction so as to define the first and second apertures.

24. A modulator as claimed in claim 10, wherein each of the third overlapping regions is of triangular shape.

25. A modulator as claimed in claim 11, wherein each of the third overlapping regions is of triangular shape.

26. A modulator as claimed in claim 24, wherein the adjacent picture elements are offset with respect to each other in the second direction.

27. A modulator as claimed in claim 1, wherein the apertures define respective picture elements.

28. A modulator as claimed in claim 27, wherein the picture elements are arranged as groups of N adjacent columns, where N is an integer greater than one, and adjacent picture elements disposed in each row and in adjacent columns of each group are defined by the first and second apertures.

29. A modulator as claimed in claim 2 wherein the apertures correspond to a plurality of picture elements and, wherein the picture elements are arranged as groups of N adjacent columns, wherein N is an integer greater than one, and adjacent picture elements disposed in each row and in adjacent columns of each group are defined by the first and second apertures, and wherein adjacent picture elements disposed in each row and in adjacent columns of adjacent groups overlap one another in the second direction within a row so as to have the first and second overlapping regions and the sum of the heights of the adjacent picture elements of the adjacent groups throughout the first and second overlapping regions is substantially equal to the height of the picture elements in the first non-overlapping regions.

30. A modulator as claimed in claim 29, wherein each picture element has a shape derived from a combined shape comprising: a rectangular portion having first and second sides aligned in the first direction and third and fourth sides aligned in the second direction; a first right-angled triangular portion having a first side coincident with the third side of the rectangular portion, a second side extending co-linearly from the first side of the rectangular portion, and a hypotenuse inclined at a first predetermined angle to the second direction; a parallelogram portion having a first side coincident with the fourth side of the rectangular portion, a second side opposite the first side, and third and fourth sides parallel to the hypotenuse of the first triangular portion; and a second right-angled triangular portion having a first side coincident with the second side of the parallelogram portion, a hypotenuse parallel to the hypotenuse of the first triangular portion and a third side which is parallel to the second side of the rectangular portion.

31. A modulator as claimed in claim 30, wherein the width of the parallelogram portion in the first direction is substantially equal to the width of the gap in the first direction between each picture element and a picture element adjacent the second triangular portion.

32. A modulator as claimed in claim 27, wherein each picture element has a shape derived from combined shape comprising: a rectangular portion having first and second sides aligned in the first direction and third and fourth sides aligned in the second direction; a first parallelogram portion having a first side coincident with the fourth side of the rectangular portion, a second side opposite the first side, and third and fourth sides inclined at a second predetermined angle to the second direction; a first right-angled triangular portion having a first side coincident with the second side of the first parallelogram portion, a hypotenuse parallel to the third and fourth sides of the first parallelogram portion and a third side which is parallel to the second side of the rectangular portion; a second parallelogram portion having a first side coincident with the third side of the rectangular portion, a second side opposite the first side, and third and fourth sides parallel to the third and fourth sides of the first parallelogram portion; and a second right-angled triangular portion having a first side coincident with the second side of the second parallelogram portion, a hypotenuse parallel to the third and fourth sides of the first parallelogram portion and a third side which is parallel to the second side of the rectangular portion.

33. A modulator as claimed in claim 32, wherein the width of each of the first and second parallelogram portions in the first direction is substantially equal to half the width of the gap in the first direction between each adjacent pair of picture elements.

34. A modulator as claimed in claim 27, wherein each of the first and second overlapping regions is of triangular shape.

35. A modulator as claimed in claim 34, wherein the adjacent picture elements are offset with respect to each other in the second direction.

36. A modulator as claimed in claim 1, further comprising a liquid crystal device.

37. A modulator as claimed in claim 1, further comprising a light emitting device.

38. A directional display comprising a modulator as claimed in claim 1 associated with a parallax device having a plurality of parallax elements.

39. A directional display comprising a modulator as claimed in claim 10 associated with a parallax device having a plurality of parallax elements, wherein at least one of the parallax elements is associated with a respective one of the groups of the columns.

40. A directional display comprising a modulator as claimed in claim 11 associated with a parallax device having a plurality of parallax elements, wherein at least one of the parallax elements associated with a respective one of the groups of the columns.

41. A directional display comprising a modulator as claimed in claim 28 associated with a parallax device having a plurality of parallax elements, wherein at least one of the parallax elements is associated with a respective one of the groups of the columns.

42. A directional display comprising a modulator as claimed in claim 29 associated with a parallax device having a plurality of parallax elements, wherein at least one of the parallax elements is associated with a respective one of the groups of the columns.

43. A display as claimed in claim 38, wherein the parallax device comprises a lenticular screen.

44. A display as claimed in claim 38, wherein the parallax device comprises a parallax barrier.

* * * * *